United States Patent [19]
Poulter

[11] Patent Number: 5,764,918
[45] Date of Patent: Jun. 9, 1998

[54] COMMUNICATIONS NODE FOR TRANSMITTING DATA FILES OVER TELEPHONE NETWORKS

[76] Inventor: Vernon C. Poulter, 89 Main St., Westford, Mass. 01886

[21] Appl. No.: 376,747

[22] Filed: Jan. 23, 1995

[51] Int. Cl.$^6$ .................................................. G06F 15/00
[52] U.S. Cl. .................... 395/200.66; 395/114; 395/117; 395/200.62; 395/200.73; 395/200.76; 395/200.8
[58] Field of Search ...................... 395/800, 200.12, 395/114, 117, 200.66, 200.62, 200.73, 200.76, 200.8; 379/93, 98; 370/85.13

[56] References Cited

U.S. PATENT DOCUMENTS

| | | | |
|---|---|---|---|
| 4,454,575 | 6/1984 | Bushaw et al. | 364/133 |
| 4,701,946 | 10/1987 | Oliva et al. | 379/102.04 |
| 4,796,091 | 1/1989 | Nohtomi | 358/444 |
| 4,902,881 | 2/1990 | Janku | 235/381 |
| 5,033,804 | 7/1991 | Faris | 312/223.3 |
| 5,086,469 | 2/1992 | Gupta et al. | 380/48 |
| 5,091,790 | 2/1992 | Silverberg | 358/434 |
| 5,123,089 | 6/1992 | Beilinki et al. | 395/200.67 |
| 5,193,110 | 3/1993 | Jones et al. | 379/93.14 |
| 5,210,824 | 5/1993 | Putz et al. | 395/785 |
| 5,226,168 | 7/1993 | Kobayashi et al. | 395/500 |
| 5,265,033 | 11/1993 | Vajk et al. | 395/200.36 |
| 5,274,762 | 12/1993 | Peterson et al. | 395/200.49 |
| 5,293,638 | 3/1994 | Engberg et al. | 455/16 |
| 5,355,365 | 10/1994 | Bhat et al. | 370/401 |
| 5,367,563 | 11/1994 | Sainton | 379/93.29 |
| 5,418,628 | 5/1995 | Perkins | 358/468 |
| 5,446,888 | 8/1995 | Pyne | 395/610 |
| 5,495,607 | 2/1996 | Pisello et al. | 395/610 |
| 5,497,371 | 3/1996 | Ellis et al. | 370/412 |
| 5,559,721 | 9/1996 | Ishii | 364/514 A |
| 5,594,660 | 1/1997 | Sung et al. | 395/806 |

OTHER PUBLICATIONS

David W. Carroll, "Asnychronous Protocols", pp. 92-95, Aug., 1985, Dr. Dobb's Journal.
IBM Technical Disclosure Bulletin, "Adding Data Security To Asynchronous Communications", pp. 129-131, vol. 32, No. 3A, Aug., 1989.
Jeff Duntemann, "Of Interest", pp. 158 and 166, Oct. 1989, Dr. Dobb's Journal.
Bruce Schneier, "Fletcher's Checksum" (Error correction at a fraction of the cost), pp. 32-38, May 1992, Dr. Dobb's Journal.
Sofer, "Delriha . . . fax software," Business Wire, Mar. 14, 1994 pp. 1-5.

Primary Examiner—Alyssa H. Bowler
Assistant Examiner—John Follansbee
Attorney, Agent, or Firm—Madson & Metcalf

[57] ABSTRACT

A communications device is attachable to a host computer. The device transmits, receives, and stores entire files of data with their attributes needed for recognition, reading, and writing by a proper application program. Logical devices such as processors, filters, locks, and telecommunications devices in the communications device include electronic circuits for assembling message files and for transmitting selected datafiles to and from an attached host computer. The communications device also transmits, stores and receives with respect to a second remote device or a computer with a modem. The device permits file communication without permitting access to its own host computer or workstation. The device may transmit while the computer is off, and without logging into the second computer provided with the same type of device. The device facilitates point to point communication of data files in a secure manner for creation of virtual private networks between individuals over public telephone networks

23 Claims, 11 Drawing Sheets

COMMUNICATIONS NODE FOR TRANSMITTING DATA FILES OVER TELEPHONE NETWORKS

BACKGROUND

1. The Field of the Invention

This invention relates to communication devices and, more particularly, to a novel communication system for universal, point-to-point communication of formatted files over a telephone network.

2. The Background Art

Throughout history, an ability to communicate with another individual or a group has been valuable. Devices and methods of communication include letters, written documents, telegraph, radio, television, telex, telephone and computers. As computers have become available in various areas, means for sending and receiving computer generated documents have developed. The principal communication devices developed are bulletin board services, facsimiles, and electronic mail (Email). These serve, respectively, the needs for mass distribution of information, image transmission, and messaging among users of a shared, private, hard-wired network.

Significantly, however, serious disadvantages and limitations exist with each of these types of communication systems. For example, bulletin board services and similar networks require a user to dedicate access and control of a computer or workstation to the communication task. Failure to do so may result in crashing the computer. In addition, service bureaus that provide bulletin boards and network services (including E-Mail capabilities) are operated by third party vendors. The computer may only connect to a service bureau by logging on. Logging on requires executing a complex set of instructions according to a set of protocols unique to the service bureau. While logged on, the storage devices of the computer may be subject to access. Information is controlled by the computer of the service. Information can only be received and broadcast by the computer of the service. No point to point messaging is available to users accessing the service.

A practical disadvantage of a computer network is security of files. Theft and chaos may result from hackers accessing sensitive files. Since each user is sharing a space in a common storage device of the computer network, one who has access to the computer network can find a way to access files, whether or not authorized. Accordingly, important files in a hard disk or other storage medium in a network can be destroyed, stolen, or permanently damaged, inadvertently or intentionally.

Facsimile (fax) technology is basically transmitting a raster image through a communications line as dots, not files as used by a software application (program) run on a computer by a user. Virtually all information of an original file, produced by an application such as a drawing program or a word processing program, is lost. Only a relatively poor (compared to the resolution of an original image or data), non-recoverable, computer incompatible, machine-unreadable, visual image of the output is transmitted for most documents.

Actual files of data cannot be transmitted. Accordingly, faxed documents cannot be edited for corrections, modifications, or the like on a computer screen. Re-entering the text of faxed documents into a computer or conversion of the faxed text by character recognition software is necessary to cleanly print, use, or modify the content of documents Even so, character recognition software is not 100% accurate. Formatting commands for achieving the appearance of the transmitted document on paper are not actually known by a recipient.

As for drawings and spreadsheets, input of the files is all but impossible. Only the visual output is transmitted. The mathematical relationships found only in the underlying datafile responsible for the printed output are lost to a receiver of a facsimile.

Moreover, a computer user using a modem (modulator-demodulator) or fax (facsimile) and associated software on a computer experiences annoying repeated intermittent interruptions. Interruptions are caused by the associated software operating in the background of the computer memory. Interruptions are triggered by competition for resources between the multiple programs (applications) operating in the CPU and stored in memory.

Image transmission is not effective or efficient for images requiring high resolution, such as, for example, medical images, technical drawings or artistic drawings. Resolution is limited. Resolution of text is so limited that scanners cannot reliably read the text. Extensive proofreading and editing are required. Even so, these poor images require massive data for minimal information, often approaching one megabyte of data per page of a visual image. The massive data files transmitted result in slow transmission of documents.

Other practical disadvantages arise from running several software programs at the same time, sharing the same central processing unit (CPU). Conflicts of software accessing the same computer resources may halt the entire operation of the computer.

BRIEF SUMMARY AND OBJECTS OF THE INVENTION

In view of the foregoing, it is a primary object of the present invention to provide a means for transmitting and receiving entire files of machine-readable, electronic data, rendered in identical format in both a sender's computer and receiver's computer (alternatively called live files), these computers may be referred to as "host computers." A host computer may be defined to include personal computers, workstations, and other generic computers operated singly or in a local area network. Datafiles prepared for transmission may be referred to as "universally formatted" files or messagefiles. Messagefiles are transmitted with data from metafiles, files containing attributes necessary for a computer program (application) to recognize a datafile and to reconstruct or recognize its data structure for reading and writing data to it. Messagefiles may also contain data for directing a datafile to a data storage location according to the nature or "message type" of the messagefile.

It is another object to provide an apparatus for point to point communication of universally formatted files between originating and destination host computers, the apparatus being operable independently of the processor, memory, and power supply of the associated host computer.

It is another object to provide an apparatus for point to point communication of messagefiles, the apparatus having no ability to initiate access to files of an associated host computer.

It is another object of the invention to provide point to point communication of messagefiles, wherein routing information for storing transmitted files, conversions, translations, formatting, protocols, handshaking, connection control, and the like are "user transparent," that is, done automatically by software, hardware, or both without intervention by a user below the level of a graphical user interface on the user's host computer, regardless of whether the user is a sender or a receiver.

It is another object to provide point to point communication of messagefiles from one user to another user, and vice versa, through an existing telephone network.

It is another object of the invention to provide an addressing system for communication of messagefiles using the telephone numbers and names of users.

It is another object of the invention to provide an addressing system for electronic mail using the telephone numbers and names of users.

It is another object of the invention to provide a device and system forming a point-to-point communication network having multiple levels of security preventing unauthorized access to files and hardware of an associated host computer by others.

It is an object of the present invention to provide a device for communication of messagefiles between host computers without a requirement that both computers be activated at the same time, nor that either host computer be activated at any specific time.

It is an object of the present invention to provide a communication system for transmitting and receiving over a telephone network, messagefiles, wherein a receiving user may operate on the date, edit files and retransmit to a sender or another party an edited messagefile.

It is likewise an object of the present invention to provide a device for transmitting, receiving, storing, disassembling messagefiles containing files wherein the format of a file is the file format of a software application, provided by a commercial software supplier, and wherein the device provides necessary communication procedures, file translations, filtering, encryptions, storage functions, security, and the like transparently with respect to a user, that is with a minimum of intervention by a user.

Another object is to provide a device for automatically querying, and selectively answering an attempted communication by a sender.

Another object is to provide a device for connection to a host computer, host network, or to a host node in a network for transmitting and receiving messagefiles over a telephone network.

Another object is to provide a programmable modem for point-to-point, private, secure transmission and receipt of datafiles with their associated formatting and application information between users at two distant locations independent of any third party computing service and without broadcast of information to other third parties.

Another object is to provide transmission and receipt of formatted datafiles between users at locations having individual telephone numbers over the public telephone network, equivalent telecommunications network, or the like.

Another object is to provide a programmable modem for transmitting and receiving messages containing datafiles, and for directing storage of each datafile according to the nature or type of datafile.

Another object is to provide virtual private networks of host computers over public telecommunication lines by providing programmable devices connectable between host computers and public telecommunications lines for receiving files, storing files, and controlling access to storage media containing files in the devices.

Consistent with the foregoing objects, and in accordance with the invention as embodied and broadly described herein, an apparatus and system are disclosed for communicating universally formatted files over existing telephone and equivalent telecommunications networks.

An apparatus may be constructed for transmitting and receiving files between a first host computer, a first apparatus operably connected to the first host computer, and a second apparatus operably connected to be accessible by a second host computer. The system for implementing the apparatus may include the first and second host computers, each having a central processor unit (CPU) for operating on data in files. Each CPU may be operable in an activated (powered) state and inoperable in a deactivated (unpowered) state. A memory device such as a random-access-memory (RAM) may be operably connectable to the CPU for storing data in files during operation of the CPU in an activated state. A storage device may be operably connected to the CPU for transmitting, receiving, and permanently storing data from the CPU, even when the CPU is deactivated. A port may be connected to the first host computer for operably connecting the host computer to the apparatus. Other ports may connect the first host computer to peripheral devices, such as a printer, additional storage media, a monitor, or the like.

The apparatus may be embodied in a first communications node comprising a storage device for storing files of data, the files formatted to be read by applications (computer programs) loadable into the memory (RAM), and executable by the CPU of the first host computer.

The apparatus may include a bus for carrying data between its component parts, thus linking or connecting each component with each other component as needed. The apparatus may also have a power supply for providing electrical voltage and current to the apparatus independent of the host computer.

A processor for manipulating files and data in files may be connected to the bus. A storage device, which may be volatile or non-volatile, for storing data, may also be connected to a bus, along with a memory device comprising random-access-memory (RAM) for temporarily storing data during processing by the processor. The RAM may be augmented by a device comprising read-only-memory (ROM) connected to the bus for providing certain data to the processor.

A data communications device for connecting the host computer to the apparatus may be connected to the bus. A telecommunications device for connecting the apparatus to a telecommunications line of a telecommunications network may also be connected to the bus. The telecommunications device may include hardware and software (programmed instructions) for conditioning the data signals transmitted between the telecommunications network and the apparatus.

A lock may be positioned on the bus, or between the data communications device and the processor for preventing accessing of the host computer by the processor. The lock may be connected to the bus to control hardware or software in the apparatus that may be capable of reading or writing data or files.

A filter may be connected between the telecommunications device and the processor, or to the bus, for limiting access to the apparatus by any unauthorized device connecting to the apparatus through the telecommunications network. By limiting access, the filter prevents writing of files or data to the storage device, and may prevent sending data to the bus or processor.

An apparatus embodied in a communications node connected to a host computer may receive instruction files for controlling the communications node, datafiles created by applications, and metafiles associated with the datafiles for identifying important attributes of the datafiles such as the identification of the types of applications capable of reading and writing to the datafile.

A second communications node may be connected between a second host computer and the telecommunications network to operate similarly or identically to the first communications node.

In one embodiment of an apparatus constructed consistent with the invention, a communications node may be configured as a programmable modem connected between a host computer and a telecommunications network. The programmable modem may receive programmable instructions for controlling the modem functions, and for storing files passed through the modem between the host computer and the telecommunications network.

The communications nodes may be provided with their own power supplies, sources of power, operating systems, and software. The communications nodes may be operable at all times, regardless of whether the respective host computers are activated or powered up. Thus, a user may send or receive files and store them, in their entirety, permanently and retrievably, without a host computer being "on" and without the host being accessible to another communications node or any other device connected to the telecommunications network.

The apparatus, or communications node, comprises several hardware components that may be called operational devices. Each operational device performs a function. Each operational device may be a hardware component, such as a plug, having no inherent logical capability. On the other hand an operational device may include a logical device.

A logical device may be thought of as an electrical or electronic circuit for operating on an input signal to produce an output signal in response. Each logical device may include hardware interface for connecting to other operational devices such as cables or logical devices such as processors.

Each logical device may be constructed to operate as a hairdwired logic circuit, operating on an input signal to produce an output signal. A logical device may operate as an analog device or as a digital device. A logical device may be embodied in an integrated logic circuit (processor) capable of manipulating data according to programmed instructions loaded into the processor.

Each logical device may have associated with it, or in it, memory for storing data received, data to be sent, or data awaiting reading by another processor or logical device. The processor may read and write data stored in a memory device connected to the processor. Data may be stored in files of words, each comprised of data. Each logical device may be constructed to have one or more logic circuits for operation, control or output from the device of one or more identifiable files of data.

Functions may be distributed among several logical devices, or consolidated into one or more processors, programmed to perform the logical functions. Thus, one or more logic circuits, each for receiving an input signal and responding with an output signal, may be consolidated into one or more integrated circuit devices.

Devices once not considered to be logical devices may be provided with logical devices for internal management and control. For example, a memory device may be provided with operating logic for control of access, and for structuring the data useful for controlling operation of the memory device. Alternatively, memory may be controlled by other elements in a circuit or device.

Programs or software may "reside," be stored or contained, in a processor. A program including logic steps may be programmed into a programmable processor. That is, data for controlling the logical steps of a processor operating on other data, may be loaded into a general data processor temporarily. In another alternative embodiment, the logical steps of a program for controlling a processor's manipulation of data may be permanently stored in a "read-only-memory" that may be read by a processor in order to obtain and run the instructions. Alternatively, a processor may be hard wired. That is, the logical steps may be fixed in a circuit or integrated circuit to operate on inputs without variation.

A filter or lock may be included in a device for excluding transmission of data. For example, data following a set of leading code characters in a stream of data may be blocked from being received. A filter may be a discrete device that denies access for transmission of incoming data to the processor absent the proper leading code characters to open a path for transmission. The filter may operate to presume acceptance, absent an anomaly in a wide range of permissible leading data characters, or to presume denial of entry absent a required, narrowly defined set of leading code characters.

Similarly, the filter or lock may be programmed into the processor. Thus, an apparatus may deny further processing or further transmission of data received through a telecommunications device absent the proper leading code characters in the data stream.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 14, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Reference is made to FIGS. 1–6, which illustrate schematic diagrams of several preferred embodiments of apparatus made consistent with the invention. Those of ordinary skill in the art will, of course, appreciate that various modifications to the data structures illustrated schematically in FIGS. 7–8, and logical operations detailed in the schematic diagrams of FIGS. 9–12 may easily be made without departing from the essential characteristics of the invention, as described in FIGS. 1–6. Thus, the following description of the detailed schematic diagrams of FIGS. 1–6 is intended only as an example, and it simply illustrates certain presently preferred embodiments consistent with the foregoing description of the invention as claimed herein.

From the above discussion, it will be appreciated that the present invention provides solutions to the foregoing problems. It will be readily understood that the components of the present invention, as generally described and illustrated in the FIGS. 1–14 herein, could be arranged and designed in a wide variety of different configurations. Thus, the following more detailed description of the embodiments of the system and method of the present invention, as represented in FIGS. 1–14, is not intended to limit the scope of the invention, as claimed, but is merely representative of the presently preferred embodiments of the invention.

The presently contemplated best mode for practicing the invention, including preferred embodiments of the invention, will be best understood by reference to the drawings, wherein like parts are designated by like numerals throughout.

Figure 13:
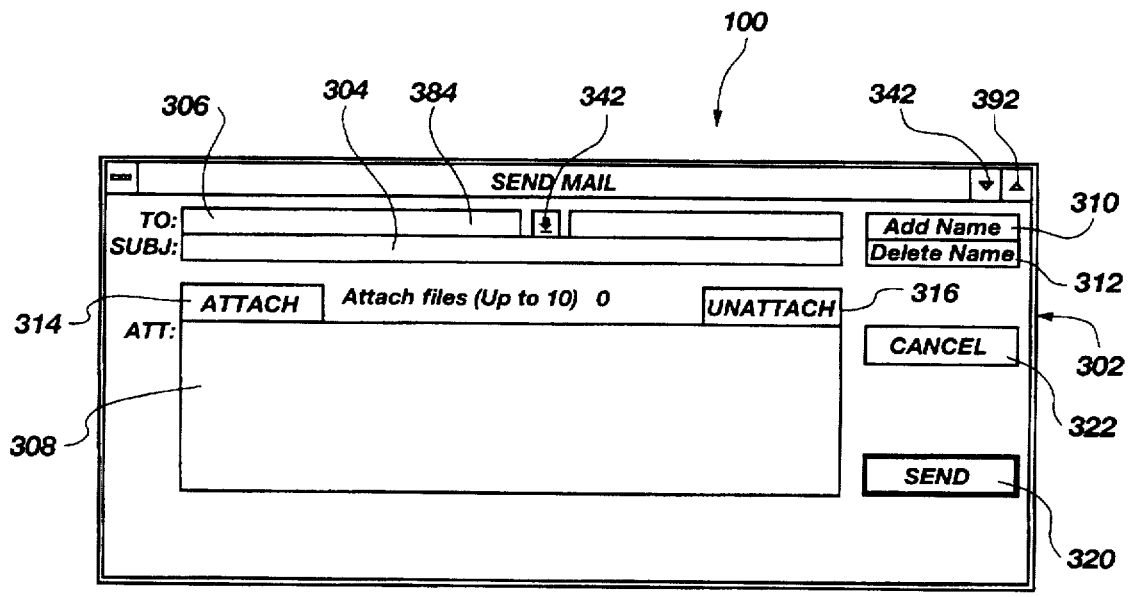
FIG. 13 is an illustration of one embodiment of a display generated by a graphical user interface and displayed on a host computer for controlling an apparatus constructed consistent with the invention.
Figure 14:
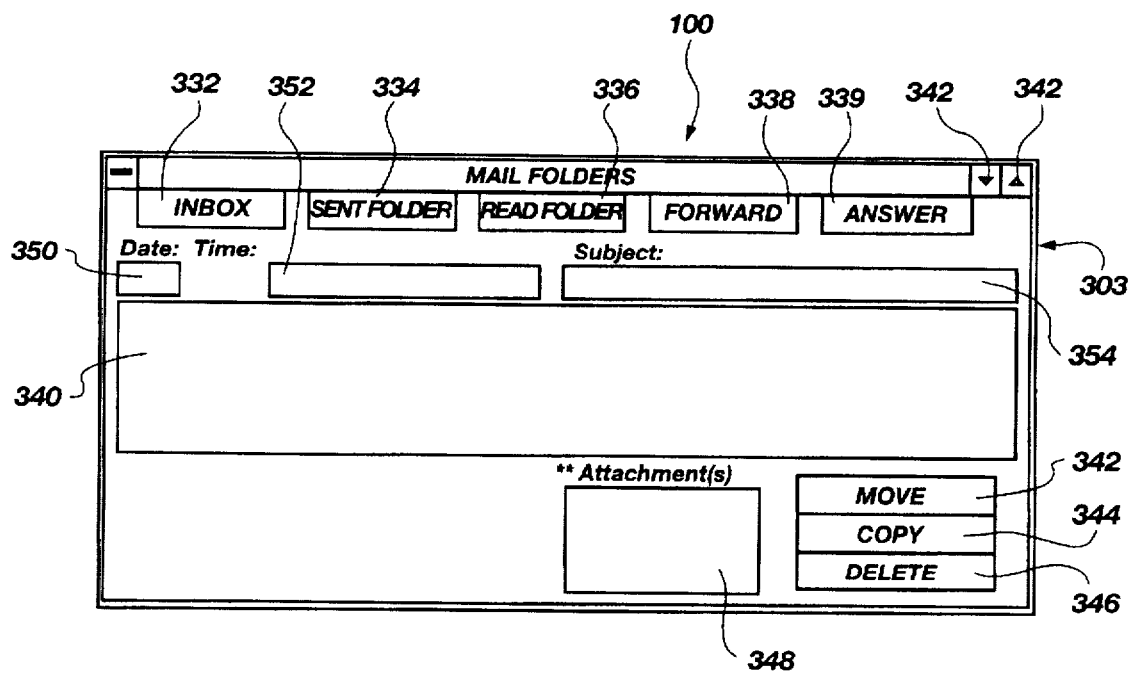
FIG. 14 illustrates another display generated by the graphical user interface of FIG. 13.

Presently preferred embodiments of a communications node 10, constructed consistent with the present invention, are illustrated in FIGS. 1–6. Data structures are represented schematically in FIGS. 7–8. Process steps are represented schematically in FIGS. 9–12, and displays from a human interface (graphical user interface) as presented to a user are illustrated in FIGS. 13–14.

Referring to FIGS. 1–6, a communications node (or node) 10 may be operably connected for communicating between a host computer (host) 12 and a remote host computer (host) 13 through a telecommunications network 14, such as the public telephone system. The remote host 13 may also be provided with a communications node 11 similar or identical to the communications node 10. Although described herein as a digital electronic device, the communications node 10 may be constructed as an analog device. The communications node 10 may be embodied in a wide variety of combinations of hardware (electronic logic circuits) and software (processor programming instructions stored in electronic data files).

The communications node 10 may include a bus 16 connecting a storage device 18, one or more processors (digital processors) 20, and a memory device 22, such as a random access memory (RAM) 22. A datacommunications device (DCD) 24 for operably linking the communications node 10 to the host 12 may be connected to a telecommunications device (TCD) 26 (e.g a modem) through the bus 16. The telecommunications device 26 may comprise hardware and software as necessary for linking the communications node 10 to the telecommunications network 14 for exchanging data.

Additionally, a security device 28 for uniquely and positively identifying the communications node 10 may be connected to the bus 16. The bus 16 may connect also to a status indicator 30 for indicating certain conditions of the communications node 10, a lock 32 for restricting reading and writing access to the host 12 by the communications node 10, and a filter 34 for restricting reading and writing access to the communications node 10 by any device connected to the telecommunications network 14. One or more read-only-memory devices (ROM) 36 for storing data reflecting information or instructions may be connected to the bus 16.

In addition, a display 37, such as a monitor screen, may be connected to the bus 16 for monitoring activities of the node 10 or processor 20, beyond the limited information communicated to a user by the status indicator 30. Other logical devices 38 may be added to the bus 16 as useful or necessary for effective operation of the communications node 10.

A logical device 38 may include a logic circuit 39. A logic circuit 39 may be hardwired to give a resultant electrical or electronic output for each input. Alternatively, a logic circuit 39 may be a micro circuit, integrated circuit, or the like for receiving programming instructions for controlling the function (output) of the logical device 38. Functions of the components 18–38 of the communications node 10 may be distributed to other, selected, logical devices 38 which may be added to the bus 16 in addition to or in place of the individual components 18, 20, 22, 24, 28, 30, 32, 34, 36, 37, 38.

Referring to FIGS. 7–12, communication by and through the communications nodes (or nodes) 10, 11 is by transmission of files 50 containing data 52 organized in a data structure. Data 52 may be in the nature of instruction files 54, and other data 52 for controlling processors 20 or other logical devices 38, datafiles 56 (live files 56) of information formatted in a useful data structure for reading and writing by a software application, or metafiles 58 containing data 52 corresponding to significant, useful attributes of associated datafiles 56. Files 50, assembled into messagefiles 60 may be transmitted and received between a node 10 and another node 11 across the worldwide telecommunications networks 14.

Messagefiles 60 sent by the equivalent nodes 10, 11 may be disassembled by the receiving nodes 11, 10, respectively, into files 50. That is, creation of the files 50 from data 52 in a messagefile 60 may be a function of the nodes 11, 10. Disassembly of the messagefiles 60 is facilitated by data 52 contained in a headerfile 62 in the messagefile 60. The files 50 such as datafiles 56, and metafiles 58, as well as other files 50 may contain data 52 for addressing storage locations of files 50. The data 52 for directing the storage of files 50 may be created by the processor 20 from information in the headerfiles 62 of the messagefiles 60. For example, a messagetype 64 contained in the messagefile 60 or headerfile 62 may contain information for disassembly and for routing the resultant datafiles 56, metafiles 58, and the like for storage in the storage device 18 or in the host 12, 13. Messagefiles 60 may exist as virtual files being assembled by sending node 10 and disassembled by the receiving node 11 in real time as the transmission from node 10 to node 11 occurs. That is, rather than writing the messagefile to the RAM 22 to be sent later, the messagefile 60 may be sent directly to the telecommunications network as its component files 50. Since the communications node 10 is capable of sending entire, identifiable files 50 rather than simply sending bits of data, the messagefile 60 may be sent as a "virtual file" comprised of a stream of files 50 with a leading instructionfile 55 for instructing a receiving node 11 how to interpret the messagefile 60. Each file 50 in a virtual file may be sent as it is readied. Thus, a virtual file type of messagefile 60 may be sent as pieces (files 50) spaced apart in time. By data 52 in the instructionfile 55 and other files 50, a clearly identified beginning and ending demarcation may be included for the messagefile 60.

A security code 66 may be written by or read from a security device 28. The security code 66 may include any number of identifying pieces of information as the caller identification, including a serial number of the node 10, the name of the user, a personal identification number, a centrally assigned security number, or other user identification. The security code 66, or another equivalent included in the messagefile 60, may also include information about the user or node 11 receiving a messagefile 60. The security code 66 may lead or follow the messagetype 64 in a messagefile 60 for controlling access to the node 10 from the telecommunications network 14.

The security code 66 of an incoming message may be used to trigger termination of transmission. The security code 66 would thus protect a receiving node 10, 11 from unauthorized access. The security code 66, or an equivalent code, may be used by a sending user at a node 10, 11 to protect against accidental receiving of a messagefile 60 by an incorrectly dialed node 11, 10, respectively. That is, if the security code 66, the user's name (inside of or independent of the security code 66), or some similar identifying parameter, does not match the telephone number of a called node 11, 10, the transmission may be halted by a decision of the sender or the receiver as reflected in controlling parameters in the instructionfile 55 or in the node 10, 11, respectively.

An embodiment of the node 10 may thus give immediate security clearance and access without the cumbersome protocols currently used by computers today. That is, a single call provides rapid security evaluation followed by immediate data transfer, instead of such methods as a call in, followed by hanging up and a call back from the receiving computer, with logging procedures required for each call.

The processor 20 may store files 50, such as a datafile 56 and associated metafile 58, on the storage device 18 for later reading by the host 12. A file 50 adapted for reading or writing by the host 12 is a transferfile 68 and may be a single file 50 or multiple files 50 recognizable or operable in the CPU 104 of the host 12. A statement regarding the host computer 12 may be applied in appropriate circumstances to the host 13.

The nodes 10, 11 are not enabled to read or write to the hosts 12, 13, respectively. A node 10, 11 may receive files 50 from a host 12, 13 over a datacommunications device 24, and may send and receive messagefiles 60 through the telecommunications device 26 over the telecommunications network 14. A communications node 10, 11, in a presently preferred embodiment, for example, may be restricted from initiating any reading or writing of data 52 of any kind to the host 12, 13, and may be disabled from reading or writing to a host 12, 13 at all. For example, the host 12, 13 may read and write data 52 and files 50 to the storage device 18 from which the processor 20 detects, such as by polling, and retrieve the data 52 for processing of a messagefile 60.

Referring to FIGS. 9–12, communication between the hosts 12, 13 through the nodes 10, 11 over the telecommunications network 14 may be similar or identical in each direction. Thus, one may treat sending and receiving operations the same in the context of the nodes 10, 11 and the hosts 12, 13. Communication may include a transfer process 70 assembly process 72, communication process 74, and disassembly process 76, each comprised of steps sequenced to be executed by the processor 20 or other structures in the node 10 and host 12.

Since functional operations of hardware and software may be interchanged, many functions may be assigned to a choice of hardware devices. Likewise, control of a device may come from within the device or from another device. Thus, the functional control within the node 10 may be described in terms of software programs or modules, regardless of where the modules are actually stored or processed.

Referring now to FIGS. 1–6, the communications node 10 may be considered in more detail. The node 10 may be connected to the host computer 12 by a cable 102, which may be of a coaxial type, 10baseT type (also referred to as ethernet), or other similar interconnect. The cable 102 may be of the parallel type, also called a centronics type cable 102.

Figure 1:
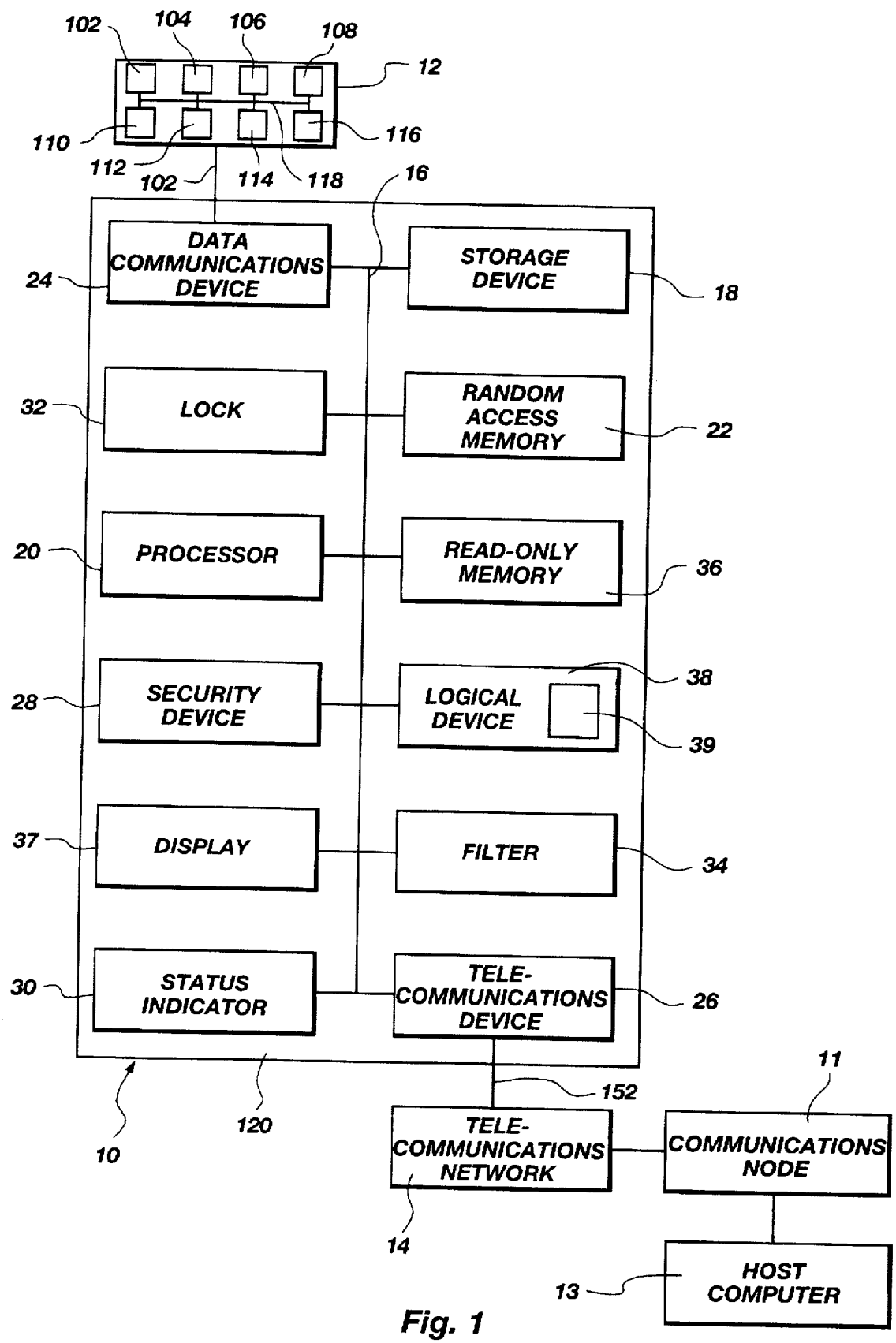
FIG. 1 is a schematic block diagram of one embodiment of an apparatus constructed consistent with the invention.

Referring to FIGS. 1–6, and more particularly to FIG. 1, the host computer 12 may be a workstation, a server in a computer network or any type of computer standing alone. Operational functions for sending and receiving messagefiles 60 may be divided between the communications node 10 and host computer 12. For example, the human interface functions for inputting instructions, displaying information to a user for making decisions, and typing in responses and commands and the like may be embedded or loaded into the CPU 104 of the host computer 12 as software programs. Alternatively, the human interface functions may be installed as firmware, for example, permanently stored in a read-only memory 106 in the host computer 12, or in the node 10.

Similarly, a keyboard 108, monitor 110, mouse 112, RAM 114, a hard disk drive 116, and the like may be connected to a bus 118 as part of the host computer 12 for the manipulating, receiving, and sending of data 52 exchanged with the communications node 10 by a user of the host computer 12. Likewise, software may be loaded into the RAM 114 and the CPU 104 of the host 12 for preparing transferfiles 68 to be communicated with the communications node 10.

The communications node 10 may be constructed largely on a motherboard 120 for holding the bus 16 and processor 20. The processor 20 may be, for example, an Intel 80286, 80386, 80486 or "compatible" processor capable of hosting the same or equivalent operating instructions. Other types of computer motherboards used may be based on different processors such as, for example, the Pentium, Motorola 68030, or Motorola 68040.

Other components such as the RAM 22, security device 28, lock 32, filter 34, ROM 36, and other logical devices 38 may be mounted to the motherboard 120 or operably connected to the bus 16 thereon. Similarly, the datacommunications device 24, telecommunications device 26, display 37 (if used) and the status indicator 30 may be connected to the bus 16 on the motherboard 120 for exchanging data with each other.

Figure 2:
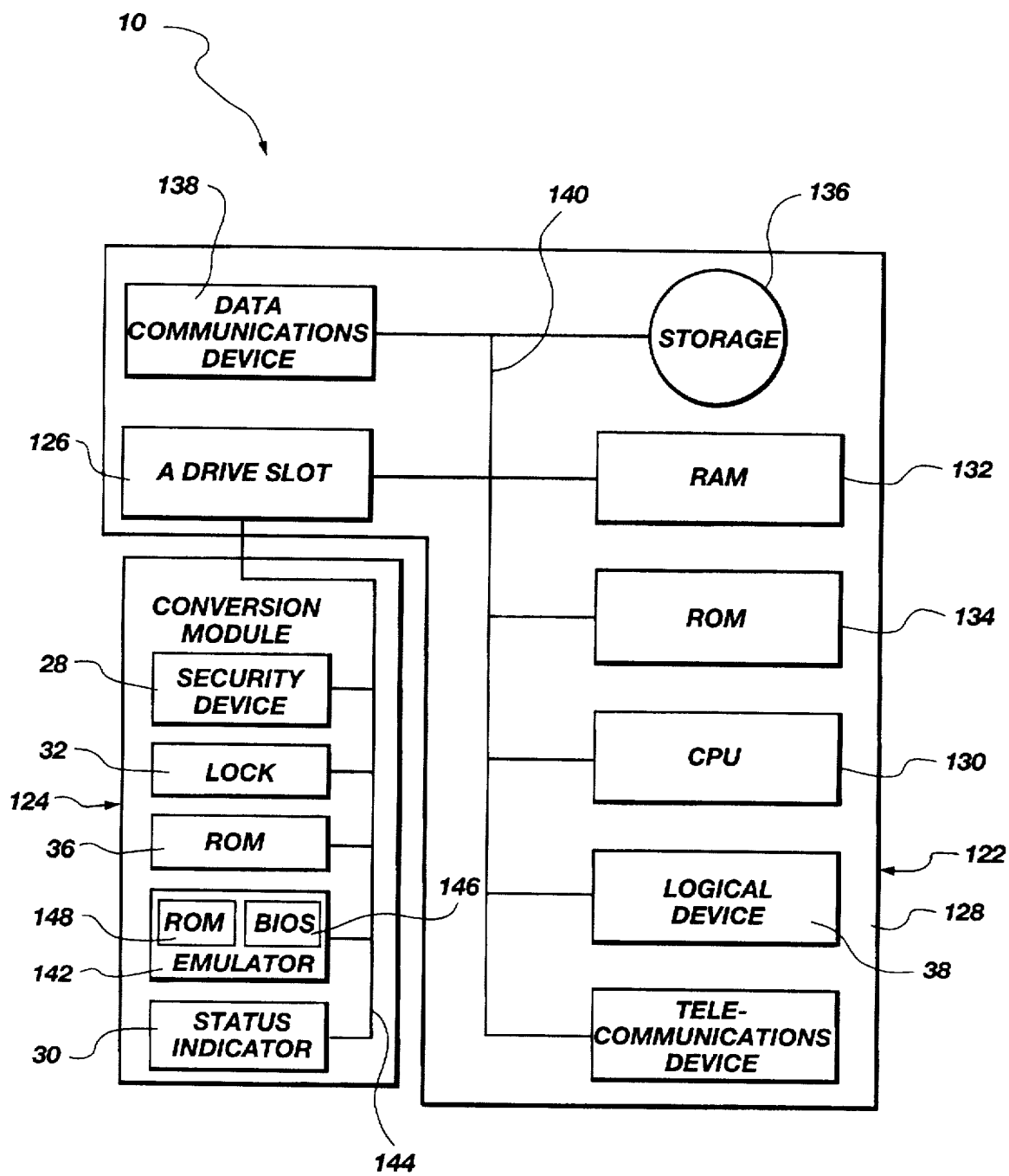
FIG. 2 is a schematic block diagram of an alternate embodiment of an apparatus constructed consistent with the invention.

Referring to FIG. 2, the node 10 may be constructed as an individual, standalone unit or may be embodied in an apparatus 10 including a recycled, perhaps even obsolete, computer 122 adapted with a conversion module 124. For example, a conversion module 124 may be connected to the slot 126 normally reserved for the floppy disk drive, (typically designated the "A" drive) of the computer 122. The conversion module 124 may be connected to the data bus 140 with the same hardware connection used by floppy disk drives.

The conversion module 124 may be integrated into the chassis 128 of the computer 122. The chassis 128 may already be provided with a CPU 130, RAM 132, ROM 134, hard disk 136 or other equivalent data storage device 136, and possibly a datacommunications device 138, all on a bus 140 and operable by programming software to be loadable onto the storage device 136.

The conversion module 124, replacing the "A" floppy drive (not shown) in the slot 126, may include the security device 28, lock 32, status indicator 30, and possibly a ROM 36. The conversion module 124 may also include an emulator 142 for emulating the missing "A" drive. All of the foregoing in the conversion module 124 may be connected by a bus 144.

The emulator 142 may include its own controlling instructions residing in its own ROM 148. Alternatively, the emulator 142 may be consolidated into the ROM 36 used in a node 10 of the standalone type. The emulator 142 may emulate or contain the boot files normally used to start up the computer 122. The module 124 may also contain files on the ROM 36 for controlling the computer 122 as a communications node 10. Still, the computer 122 is operational when the host computer 12 is "off" in an unpowered condition, and may be restricted from reading and writing to the host 12 under any and all circumstances. This access restriction may be accomplished by operation of a logical device 38, by the lock 32 or by software loaded into the storage device 136 or ROM 36, 148.

In operation, the CPU 130 may recognize the conversion module 124 as if it were the missing "A," or default, floppy disk drive. That is, the CPU 130 queries over the bus 140 for the presence of a data diskette in the "A" drive. The CPU 130 seeks boot files for initial operational programming of the CPU 130, if they exist. If no "A" drive, boot file, or diskette exists, the CPU 130 continues looking for the boot files on the hard disk 136, typically designated as the "C" drive. The boot files for the computer 122 may be stored in the ROM 36 in the conversion module 124, or on the hard disk 136. Consequently, the communications node 10 may be booted up directly from the conversion module 124.

Programs or files including boot files such as, for example, AUTOEXEC.BAT and COMMAND.COM may be embedded in a basic input and output (BIOS) chip 146 or a ROM 148 associated therewith as part of the emulator 142. Alternatively, the boot files may be located on the ROM 36 located in the conversion module 124, while the emulator 142 does a bare minimum. The emulator 142 may merely cause the CPU 130 to resort to the hard drive 136 for booting up and control.

The conversion module 124 may include the status indicator 30 for indicating the status of the module 124 and storage device 136. The status indicator 30 and lock 32 may operate in manners similar to those of corresponding devices in a communications node 10 of a freestanding type.

Figure 3:
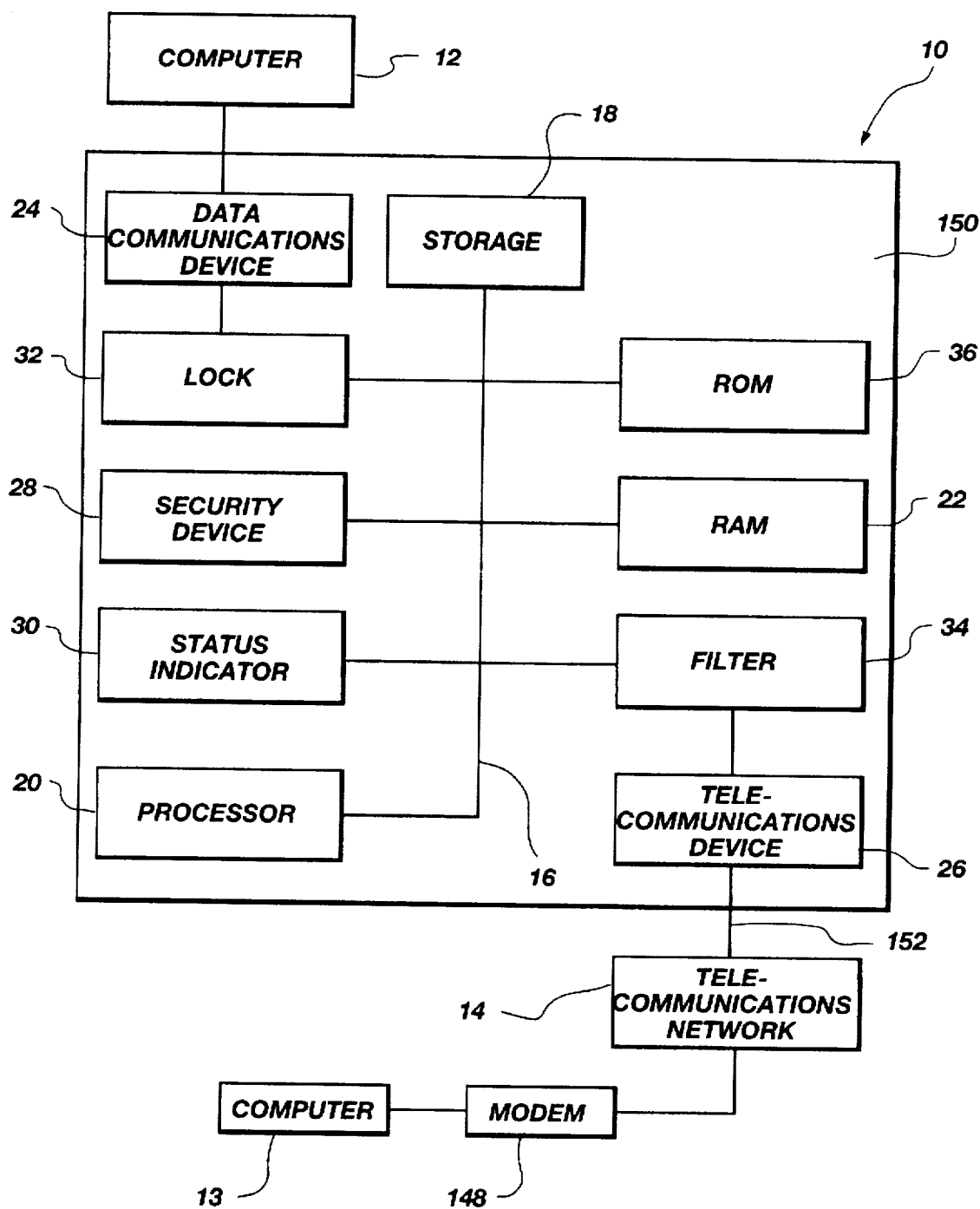
FIG. 3 is a schematic block diagram illustrating an alternate embodiment of an apparatus constructed consistent with the invention.

Referring to FIG. 3, the communications node 10 may be configured to communicate with computers 13 having modems 148. For example, the communications node 10 may be configured as a programmable modem 150 capable of emulating any of numerous modems 148, with their associated protocols, command structures, application inputs, and the like for accessing virtually any computer 13 accessible through a modem 148. The processor 20 of the communications node 10 may be programmed to emulate the dedicated modem 148 for accessing computers 13 not having the communications node 11, but connected to the telephone network 14 by a modem 148.

The programmable modem 150 may include memory in the form of a storage device 18, RAM 22, and ROM 36. The modem 148 does not store datafiles 56, and cannot typically store messagefiles 60, but passes data bits to the computer 13 directly. The modem 148 typically conditions a telephone line 152 for receiving data bits from a computer 13.

By contrast, the programmable modem 150 may store files 50 of various types, such as datafiles 56, messagefiles 60, and the like in the storage device 18. Thus, security of the host computer 12 is greatly enhanced because no access to the computer 12 is required to receive and store files 50 in the programmable modem 150.

Moreover the communications node 10 or programmable modem 150 may still send messagefiles 60 directly to another computer 13. By sending a messagefile 60 directly is meant that a file 50 is transmitted as a file 50, not as a bit stream of unidentifiable data 52. That is, for example, a datafile 56 is maintained in the same data structure that it was created in by an application (computer program) and that structure is transmitted in a metafile 58. Thus, the attributes necessary for recognizing, reading, writing, and editing the file 50 are provided in a metafile 58 with the datafile 56 to maintain the integrity and interpretability of the datafile 56. No file 50 need be transmitted as a bit stream of data 52 in an unknown format.

Security may be improved by connecting the filter 34 between the telecomunications device 26 and the bus 16, and the lock 32 between the datacommunications device 24 and the bus 16. The telecommunications device 26 and the datacommunications device 24 may be connected directly to the bus 16. However, the filter 34 and lock 32 may be logical devices configured to absolutely limit communication to the bus 16 from the telecommunications network 14 and to the host computer 12 from the bus 16, respectively.

The filter 34 may be configured in one embodiment to be actuable by an incoming messagefile 60 coming into the node 10. For example, a sending user may send a messagefile 60 in which the name of the receiving user does not properly correspond with the telephone number accessed. The filter 34 may then be actuable by data 52 in the messagefile 60 for the benefit of the sender who may not want a confidential message sent to an incorrect node 10 associated with a wrong telephone number. Thus, an incorrect combination of name and number may trigger the cessation of all further transmission of the messagefile 60. Likewise, the filter may be actuable by a combination of parameters associated with a sender, or a receiver, or both, and contained in the messagefile 60.

This embodiment may provide sender-controlled security as well. The embodiment can thus reduce or eliminate the common problem experienced by business users who now must rely on a boldly printed message on a coversheet of a facsimile transmission. The message typically directs the recipient not to read the content if the facsimile is improperly sent to a wrong number.

On the other hand, many of the functions of the communications node 10 may distributed in the host computer 12. For example, the datacommunications device 24 may connect the processor 20 for reading and writing to the computer 12. However, security is greatly improved by enabling the computer 12 to read and write to the communications node 10, and not vice versa. The processor 20 may then obtain instructions by frequently polling certain of the files 50 stored on the storage device 18 by the host computer 12. That is, certain files 50 may be written specifically for reading by the processor 20 to obtain operating instructions for communicating with the host computer 13 through the telecommunications network 14.

Because the programmable modem 150 is programmable by loading the proper software into the processor 20, any computer 13 connected to the telecommunications network 14 may be accessed by a user. The ordinarily complex task of logging onto the computer 12 through the modem 148 may be transparent to the user. That is, the user need not see and interact with all of the cryptic commands and data required for logging on to the host computer 13. Instead, all of the communications protocols, systems command structures, commands, queries, responses, inputs, data, codes and the like may be pre-programmed into the communications node 10. Thus, all commands and responses required for logging on to the computer 13 through the modem 148 may be automated with little user intervention.

For example, a user may only need to select the datafiles 56 to be sent, and a destination. Key information may be selected from a menu displayed on the monitor 110. Using the key information, other information may be retrieved from the storage device 18 or from the computer 12. For example, the names and telephone numbers associated with the computer 13 may be stored in the storage device 18. All the required communication protocols, commands, and responses may be likewise stored and read for use automatically by the communications node 10. Similarly, commands and responses required by the computer 13 for accessing the services provided by the computer 13, may be provided for a user automatically by the communications node 10 (programmable modem 150).

The user may load all the foregoing as software provided on a medium ready for loading into the storage device 18.

The processor 20 may launch (run, operate) the software retrieved from the storage device 18. Thus, a user need only see a minimum set of options, such as a menu, or set of nested menus directing the user to the service, computer, remote user, or the like associated with the host computer 13.

Moreover, the communications node 10 (programmable modem 150) may be programmed to try to connect to the modem 148 periodically or at specified times, making and maintaining a connection whenever the computer 13 is "on." By contrast, the host computer 12 may be "off," or used for other purposes. The programmable modem 150 does not interfere with the resources (e.g. CPU 104, RAM 114, ROM 106) of the host computer 12, but uses its own. Thus, the complex, aggravating, time-consuming, computer-crashing process of making a connection to a host computer 13 through a modem 148 is eliminated for the user of the host computer 12.

When embodied in the programmable modem 150 of FIG. 3, the communications node 10 may access virtually any computer 13 equipped with a modem 148, by emulating a modem, protocols, and other commands required by any network or data service. That is, unique hardware and software associated with such services as, for example, Lexis/Nexis, Compuserve, and the like, may be emulated by the processor 20 of the programmable modem 150 and made accessible to the host computer 12 through the programmable modem 150 as if through a dedicated modem.

The communication process may be further enhanced, however, if the host computer 13 is provided with a communications node 11, like the programmable modem 150. With the communications nodes 10, 11, the process of transferring data 52 is done by transferring entire datafiles 56 with their metafiles 58 in messagefiles 60 easily routed by a receiving node 11, 10 and computer 13, 12 according to the messagetype 64 in the headerfile 62. The user may immediately use files as datafiles 56 rather than as an unrecognized stream of data bits of unknown origin.

The users of the host computers 12, 13 might otherwise have to contact one another by telephone for an oral conversation. The oral conversation would typically be directed to communicating the protocols, operating commands, the time when both computers would be "on" and available without other conflicting tasks proceeding, and the like. Such a process is cumbersome, limited by language barriers and time zone differences, wasteful of time and other resources, and not widely useful. By contrast the programmable modem 150 may manage the entire communication process, transfer complete datafiles 56 in a recognizable format, and provide multiple levels of security instead of leaving the host computer 12 accessible to breaches of security.

The telecommunications network 14 may include telephone lines 152 readily connectable to the datacommunications device 24. Private systems are proliferating, offering access and on-line time to users for a fee. Such private networks are within contemplation for connection of the communications nodes, 10, 11. However, the public telephone network with its well-maintained, accessible, array of hardware, software, and individualized numbers assigned by name may be fully satisfactory in many or even most circumstances. Thus the telecommunications network 14 may begin with a telephone line 152 at the home or business of a user. The communications node 10 may be connected to the telephone line 152, and the dat-acommunications device 24 may then connect to any other communications node 11 connected to the telephone network 14 at any location assigned a telephone number, virtually anywhere worldwide.

Referring to FIGS. 1–5 the storage device 18 may be selected from a variety of media for data storage. For example, a floppy diskette, hard disk drive, Bernoulli™ drive using a flying head over a flexible disk as a storage medium, or read/write optical drive may serve as a storage device for containing files 50 such as messagefiles 60 and datafiles 58. Under certain circumstances, random access memory may serve as the storage device 18.

Figure 4:
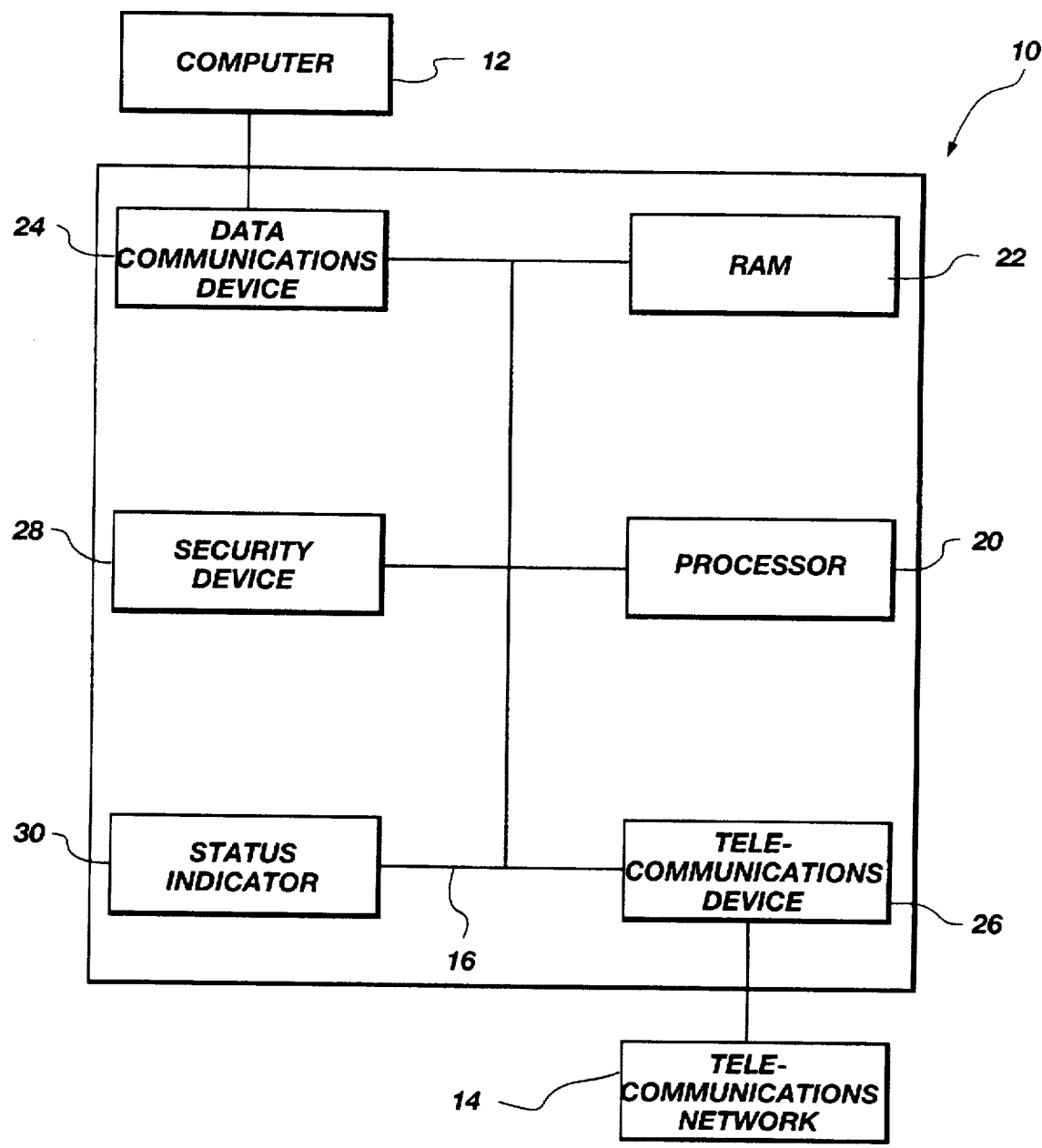
FIG. 4 is a schematic block diagram illustrating an alternate embodiment of an apparatus constructed consistent with the invention, having relatively fewer components.
Figure 5:
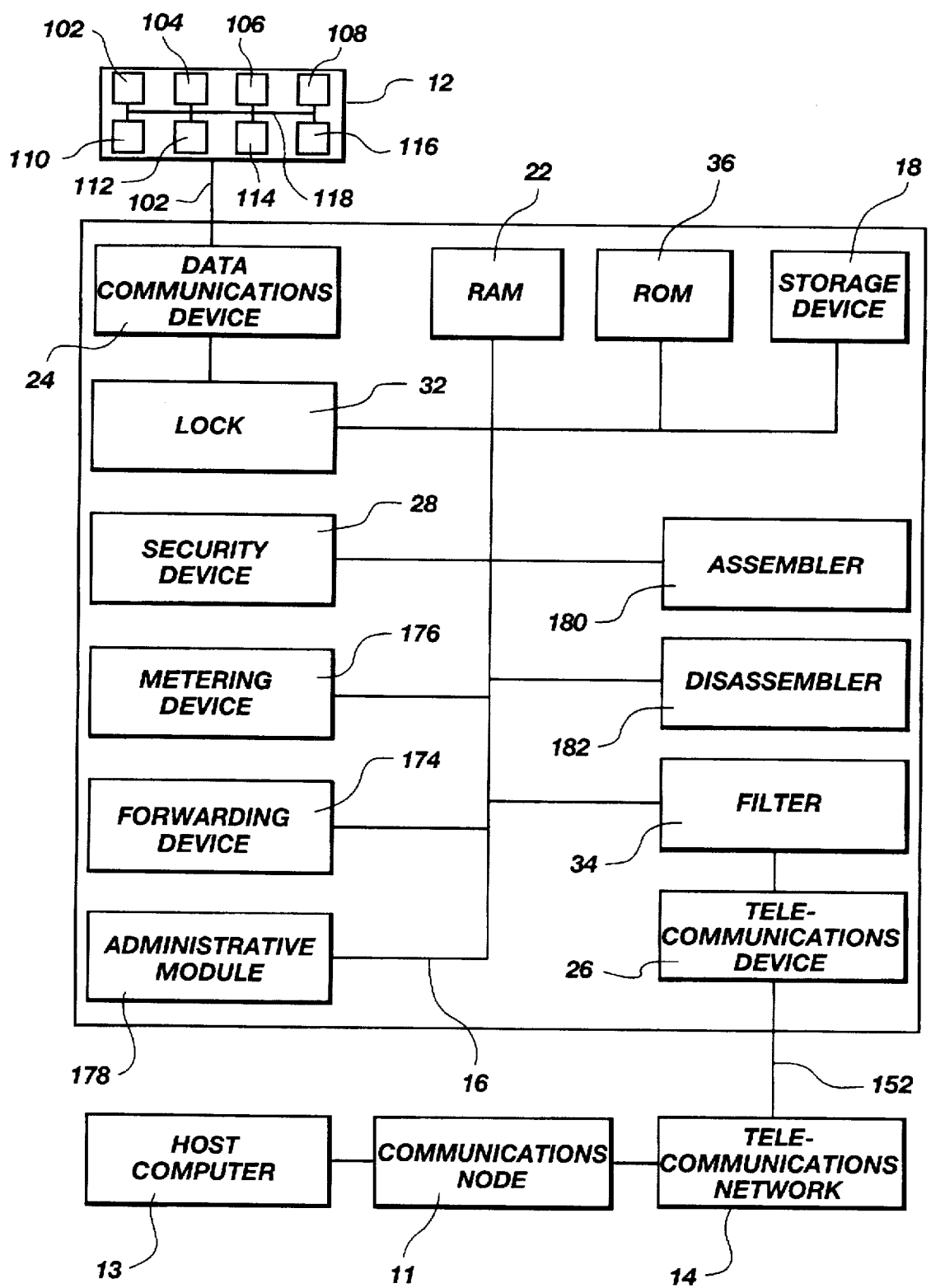
FIG. 5 is a schematic block diagram of one embodiment, of an apparatus constructed consistent with the invention in which the processor has no access to the host computer.

For example, referring to FIG. 4, the communications node 10 may be embodied in a simple configuration. Here, the RAM 22 may replace the storage device 18, since the storage device 18 may be selected from a variety of volatile and non-volatile storage media designed for storing data. A non-volatile storage medium or device is one that can contain data without any power or voltage being applied. Thus, a hard drive, floppy drive, and some monolithic, solid-state memory devices are non-volatile. Random-access memory, on the other hand is typically volatile, since the data stored therein disappears in the absence of a continuously applied voltage.

Because the communications node 10 may be powered up (on) at all times, volatile memory such as RAM 22 may operate to store messagefiles 60, datafiles 56, metafiles 60, and so forth. The necessary instructions for programming the processor 20 may be loaded into the RAM 22 by the host computer 12 when the communications node 10 is first set up and turned on. The security device 28 may be replaced by a security code 66 written to the RAM 22 by the host computer 12, further reducing the number of components in the node 10.

The memory 22 or RAM 22 used in the node 10 may be selected from several commercially available devices, whether used alone, as the sole memory, or as temporary memory for use by the processor 20. The volatile nature of the RAM 22 means that it is operational only when powered up (on), and all data is lost if powered down (off). The principal consideration in selection of the type and quantity of RAM 22 located in the communications node 10 may be the nature and size of files 50 processed by the processor 50. Messagefiles 60 may become very large, requiring large capacity for the temporary storage of the data 52 contained therein.

During assembly and disassembly of messagefiles 60, substantial capacity, greater than twice or three times the size of the longest messagefile 60 may become critical. For example, image files from medical databases may require several megabytes each, and entire files 50 may be configured to contain gigabytes of data. This is an extreme case, and the node 10 may be made to operate with a minimum of RAM 22 to handle files 50 containing more data than can be stored in the available RAM 22. However, the effective speed of the processor 20 may be directly dependent on the amount of RAM 22 available for temporarily storing portions of files 50 on which the processor 20 is operating.

The storage device 18 may be a portion of the RAM 22 used by the processor 20. A battery may be connected to maintain voltage on such a volatile storage device 18 to prevent loss of data or files 52 when the node 10 is "off." Comparing some potential, minimum configurations for the node 10, the RAM 22 without another storage device 18 may provide a suitable node 10. However, the capacity of the RAM 22 would limit the total size of files 50 storable between downloading by the host computer 12. Messagefiles 60 could be lost if a user did not download regularly into the computer 12. Alternatively, replacing the RAM 22 of FIG. 4 with a non-volatile storage device 18 may result in much slower assembly, transmission, and disassembly of messagefiles 60.

The communications node 10 may also include another memory devices, such as, for example, a read only memory (ROM) 36 connected to be read by the processor 20. The ROM 36 may contain data readable by the processor 20 for programming the processor 20 or other logical devices 38 on the bus 16.

Referring to FIGS. 1–6 The datacommunications device 24 may be configured to send data, receive data, or both with respect to the host computer 12. The data communications device 24 may include a Centronics-type hardware connection, alternately referred to as a parallel port or printer port. An associated cable 102 may extend between the datacommunications device 24 and the bus 118 of the host 12. The datacommunications device 24 may include a logic circuit and may execute logical instructions permanently or temporarily stored in the device 24. Alternatively, the datacommunications device may rely on the processor 20 for all control. In a minimum functional arrangement, the datacommunications device 24 could be a hardware interface relying on the processor 20 for all logic and control. Other communication ports, such as, for example, an RS-232 serial port, a network card, or the like, and associated cabling, may serve as the datacommunications device 24 linking the communications node 10 and host computer 12.

As illustrated in FIG. 2, the datacommunications device 24 may be separated from the bus 16 by a lock 32 connected to the bus 16. The lock 32 may contain a logic circuit for limiting access to the datacommunications device 24 by the bus 16. Thus, the lock 32 may restrict the processor 20, or the telecommunications device 26, connected to the bus 16 from accessing the host computer 12 through the datacommunications device 24. Alternatively, the lock 32 may be connected to the bus 16, 144 as in FIGS. 1–3 for providing instructions or requirements that must be satisfied before access is permitted by the bus 16, 144 to the datacommunications device 24.

The telecommunications device 26 may be connected to a telephone line 152. The telecommunications device 26 may be or may use a modem (modulator-demodulator) interface. The telecommunications device 26 may transmit and receive data by a standardized protocol having a suitably high speed of data transfer, such as, for example, the ZMODEM protocol. Alternate protocols may include, for example, ASCII, XMODEM, YMODEM, Kermit, and HSLINK. The transmission rate or speed of the telecommunications device 26 may be higher than 2400 baud, and may be as high as hardware or telecommunications network 14 limitations will permit.

The security device 28 may be a hard wired logical device for transmitting a security code 66, such as a device serial number assigned by a manufacturer for each communications node 10. The security code 66 may also include additional information such as the actual name of the sender, the recipient, or both. The security code 66, or some other portion of a messagefile 60, may include a time and date of transmission, thus providing the equivalent of an electronic date stamp or post mark.

When a user sets up security parameters for the filter 34, telephone numbers, names, security codes, time periods and the like may be input as parameters by which incoming communications may be filtered. The sending user and receiving user may each have parameters available to them for inclusion in setting up the nodes 10, 11, or messagefiles 60 for controlling improper receipt of messagefiles 60. Incorrect, non-corresponding, or expired parameters in data 52 from the security code 66, instructionfile 55, headerfile 62, or the like, may thus form the basis for denial of access by a messagefile 60 to a node 11, 10. The electronic postmark may also serve other evidentiary and evaluation purposes.

The security code 66 may be transmitted during establishment of communication between the nodes 10, 11. Alternatively, the security code 66 may be returned by the security device 28 in response to a signal transmitted to the security device 28 by the processor 20. The processor 20 may then assemble a messagefile 60 including the security code 66. Alternatively, the security device 28 may contain a stored program for writing a security code 66 in digital data format transmissible to the processor 20 in response to a query by the processor 20.

The security device 28 is principally designated for providing necessary, unique, and identifiable codes for addition to messagefiles 60. However, the security device 28 may contribute to satisfying control of incoming messagefiles 60 by providing to the processor 20 data corresponding to the types, geographical areas, telephone numbers, names, serial numbers or other identifying labels associated with devices such as node 10, or node 11 calling the node 10 over the telecommunications network 14. Thus, the security device 28 may be programmable, pre-programmed, or simply a hard-wired logic circuit for assuring identification of the node 10 through the telecommunications device 26 and network 14 to node 11.

The filter 34 may operate similarly for limiting access to the bus 16, storage device 18, and processor 20 through the telecommunications device 26. The filter 34 may be a logical device 38 comprising logic circuits and containing programmed instructions for operation. The filter 34 may be connected between the bus 16 and the telecommunications device 26 (FIG. 3) to read portions of a headerfile 62 on an incoming messagefile 60, such as a security code 66 and the messagetype 64. The filter 34 may immediately halt receipt of any messagefile 60 that may not pass a test for acceptability. Alternatively, the filter 34 may be connected to the bus 16 (FIGS. 1, 2, 4) for providing data for processing a messagefile 60 after receipt and storage in the storage device 18.

In yet another embodiment, the filter 34 may block disassembly of a messagefile 60 by failing to detect necessary codes. However, security may be enhanced by limiting access to the bus 16 by any other computer 13. That is, limiting the ability of another computer 13 to write to the processor 20, read the storage device 18, and read or write to the host computer 12 may be accomplished by a filter that simply cuts off communication through the telecommunications device 26 before a complete messagefile 60 is sent to the node 10.

Alternatively, permitting any messagefile 60 to be written to the storage device 18 does not create a substantial risk to security of the storage device 18 or host computer 10. Moreover, messagefiles 60 may become corrupted and require some reconstruction, rather than outright denial of access. Thus, a corrupted messagefile 60 may be denied access to the node 10 beyond the filter 34, or may be transmitted on to the storage device 18. The messagefile 60 may then undergo further processing and evaluation by the processor 20 and filter 34 before being disassembled and rewritten into a datafile 56 and metafile 58 for reading by the host computer 12 with some penalty in performance.

The filter 34 may be programmed inside itself by instructions on software or ROM. The filter 34 may simply trigger, cutting off the physical, electronic connection between the communications node 10 and telecommunications network 14 if certain data is not present, or written in a proper format. By each of these means and their equivalents, the filter may function to limit any computer 13 from reading data from, or initiating queries directed to the storage device 18 of the node 10. The filter 34 also may act entirely to prevent access to the processor 20 by any computer 13 or equivalent calling in to the communications node 10 through the telecommunications device 26.

Alternatively, the security device 28, lock 32, and filter 34 may be controlled by, programmed by, or resident in the processor 20. However, in one presently preferred embodiment, each is a separate, logical device controlled by programmed instructions. The function of limiting access to the computer 12 by the processor 20 or the bus 16 is performed by the lock 32, while the function of limiting access to the node 10 through the telecommunications device 26 is performed by the filter 34. The function of the security device 28 is providing a security code 66 or similar data to the processor 20 for inclusion in a messagefile 60 to permit a messagefile 60 to be accepted when received by another communications node 11.

Figure 6:
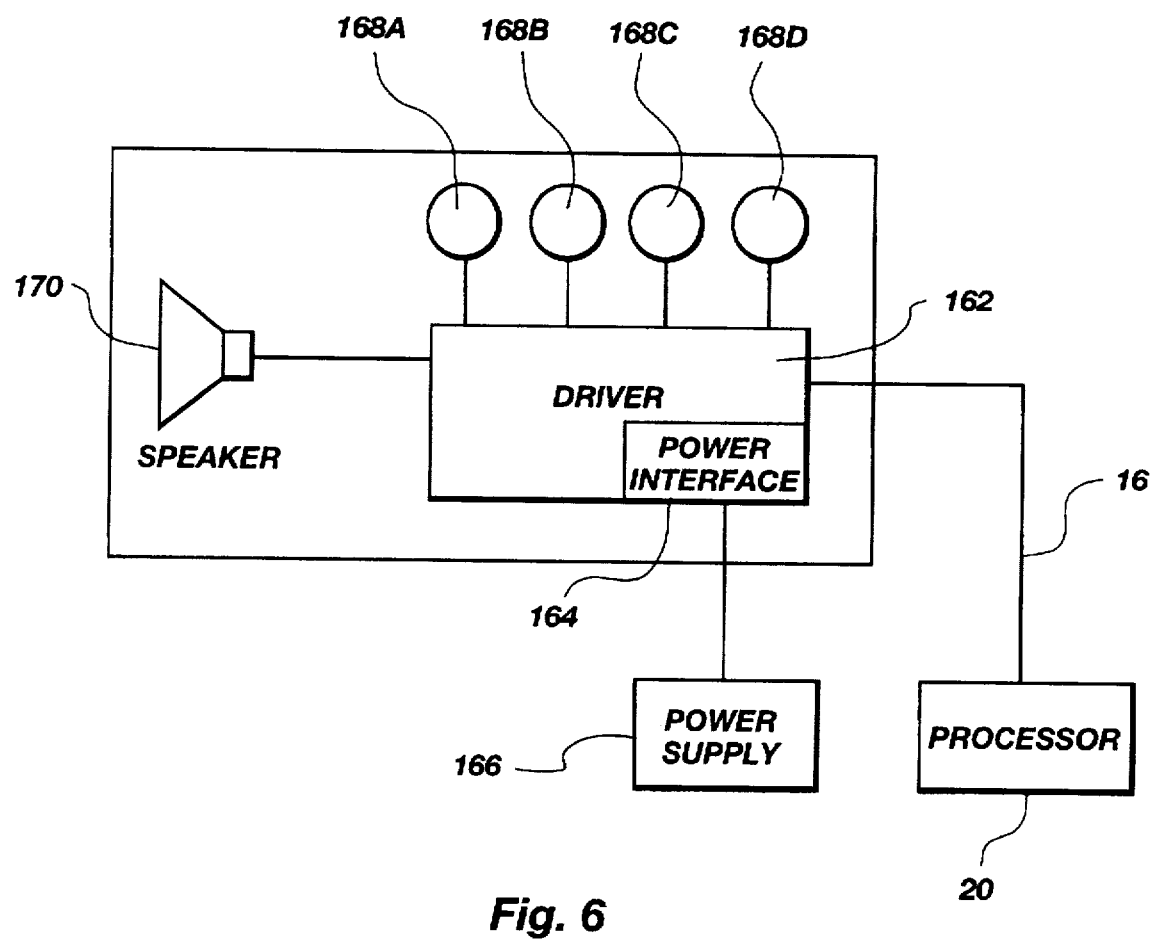
FIG. 6 is a schematic block diagram of a status indicator for inclusion in an embodiment of an apparatus constructed consistent with the invention.

Referring to FIG. 6, the status indicator 30 may be connected to the bus 16 of the communications node 10. A driver 162 may include a power interface 164 for supplying power from the power supply 166 of the communications node 10. Although not shown in other Figures, the independent power supply 166 may be an integral part of any and all of the embodiments of the communications nodes 10, 11. The driver 162 may be programmed for receiving control data from the processor 20 over the bus 16. The status indicator 30 may send status data over the bus 16 to the processor 20 for forwarding to the host computer. Status information may then be displayed as an image on the monitor 110 of the host computer 12.

Alternatively, the status indicator may be integrated to be controlled by the processor 20 and to display status information directly by itself. For example, in one embodiment, the status indicator 30 may include light emitting diodes (LEDs) or lights 168A, 168B, 168C, 168D for indicating, respectively, that: the communications node is "on" 168A, "communicating" 168B, has received a "message In" 168C, or has received an "urgent message" 168D. The "on" 168A status may simply indicate that the communications node 10 is operating, or receiving power. Alternatively, it may indicate that all components are responding properly to polling on the bus 16.

When the communications node 10 is transmitting or receiving data, the "communication" 168B light may be illuminated. Similarly, the "message in" 168C light and "urgent message" 168D may be lighted whenever a messagefile 60 has been received but not downloaded from the storage device 18 of the communications node 10 to the host computer 12.

Other devices and methods for alerting a user to the status of the communications node 10 may include, for example, displaying a message on the monitor 110 of the host computer 12. Also, a sound generated over a speaker 170 in the communications node 10 may be activated in lieu of, or in addition to, the status lights 168A, 168B, 168C, 168D for alerting a user to activity in the node 10. Moreover, a synthesized or recorded voice may be digitized and played over the speaker 170 by the driver 162, with processing assistance from the processor 20. Other possible modifications and adaptations for the status indicator 30 may include a range of programmable responses through a host of peripheral devices or screen displays.

Referring again to FIG. 5, the communications node 10 may be embodied with alternatives to the single processor 20. For example, individual functions may be performed by individual logical devices 38, such as a forwarding device 174, metering device 176, administrative module 178, assembler 180, and disassembler 182. The assembler 180 may perform the function of assembling messagefiles 60 from data 52 provided by the host computer 12. The disassembler 182 may read incoming messagefiles 60 and subdivide each into its useful parts, files 50, datafiles 56, metafiles 58 and other data 52.

The forwarding device 174 may be configured for re-sending messagefiles 60 received by the communications node 10, sub-parts thereof, or the like. For example, a user may set the forwarding device 174 to forward various data 52 to a new communications node 11. The data 52 may correspond to status information or messagefiles 60 themselves. Upon receipt of the messagefile 60 by the communications node 10, the disassembler 182 may process the data 52 into a datafile 56, metafile 68, and so forth, as appropriate. Meanwhile, an administrative module 178 may broadcast on the bus 16 data corresponding to receipt of the messagefile 60. The forwarding device 174 may then re-send all or part of the messagefile 60 to the communications node 11 previously designated by the user. Useful data 52 may include a status condition, the telephone number of a sender accessing the node 10, the datafile 58, or the entire messagefile 60, according to the desires of the user. The forwarding device 174 may activate the telecommunications device 26, instigating the calling of the communications node 11, or simply a paging number for forwarding data 52 corresponding to an alphanumeric message or other output of a paging device with the user.

The metering device 176 may be configured to log data 52 corresponding to various useful information. For example the metering device 176 may log telephone numbers called by the communications node 10 and those from which calls were received. A user may also desire to know times of access, time span of access, and security codes 66 of callers in and out of the node 10. Data 52 may also be collected corresponding to other facts related to security. Also, other information may be useful in developing contact lists, assessing usage of the node 10, billing for connection time or services.

The assembler 180 and disassembler 182 may each be combined as separate functions residing (loaded) into a single, programmable processor 20. Alternatively, each may be embodied in a separate logical device 38 having its own instruction set. It is instructive to discuss the structure of data 52 in the files 50, particularly the messagefiles 60, in terms of a distinct assembler 180 and disassembler 182.

Figure 7:
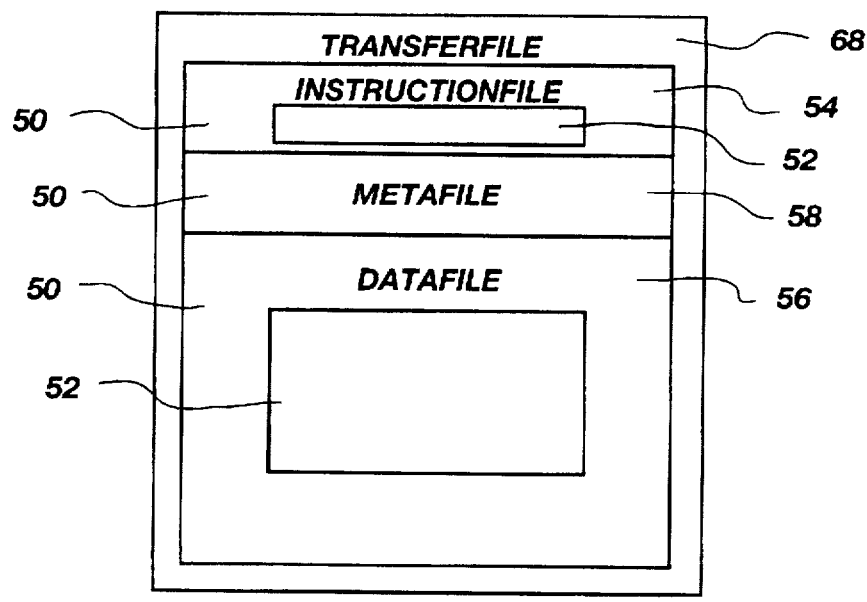
FIG. 7 is a schematic block diagram of a one level of the data structure of a transferfile suitable for sending and receiving by an apparatus constructed consistent with the invention.
Figure 8:
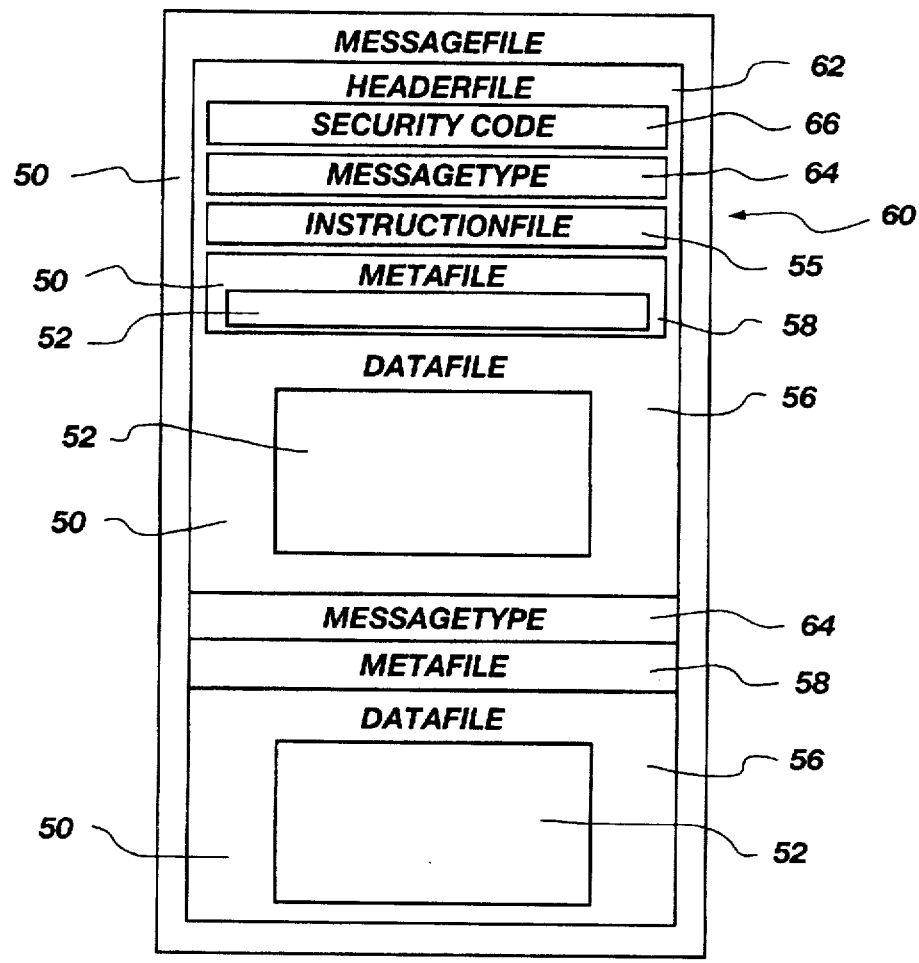
FIG. 8 is a schematic block diagram of one level of the data structure of a messagefile suitable for transmission between a host computer and an apparatus constructed consistent with the invention.

Referring to FIGS. 7–12, and more particularly to FIGS. 7–8, the files 50 may typically be any organized accumulation of digitally encoded data 52 that can be recognized by a digital electronic device, such as a logic device 38, processor 20, storage device 18, or the like. Files 50 are stored and manipulated in the processor 20 of the communications node 10 as well as in the CPU 104 of the host computer 12.

Referring to FIG. 7, a transferfile 68 may be created by the CPU 104 of the host computer 12. The transferfile may be created by a user using a graphical user interface (GUI) 100 (see FIGS. 13, 14), for displaying information to a user on the monitor 110, and receiving inputs from a user through the keyboard 108 (see FIGS. 1, 5). The GUI 100 may be configured to operate in different types of environments. For example, single user operating systems such as Windows™, MS-DOS™, UNIX, OS/2™, Macintosh™ and the like are common. Alternatively the environment may be a local area network (LAN) communications systems such as those produced by NOVELL, Microsoft, LOTUS, or the like.

The transferfile 68 may include an instructionfile 54 containing data 52 for controlling the communication process of the communications node 10. The data 52 included in the instructionfile 54 of the transferfile 68 may include selections of protocols used to dial, respond, log, and record calls through the telecommunications device 26.

In addition, the transferfile 68 may contain a datafile 56 to be transmitted. The transferfile also includes all or part (as appropriate) of the associated metafile 58 used by the CPU 104 in operating on the datafile 56.

Transferfiles 68 may be created by the node 10 or the host 12. Incoming messagefiles 60 may be disassembled by a disassembler 182 or the processor 20 to form transferfiles 68 to be written to the storage device 18. The processor 20 may be configured to write to the host computer 12, but security may be improved if transferfiles 68 are always written to the storage device 18. The processor 20 may be programmed to poll the storage device 18 for the presence of transferfiles 68 created by the host 12. The host 12 may be programmed to poll the storage device 18 for the presence of transferfiles 68 created by the communications node 10.

Referring to FIG. 8, files 50 may be organized into messagefiles 60 for transmission and receipt by the communications nodes 10, 11. A messagefile 60 is itself constructed by the processor 20, or by the assembler 180, from other files 50, particularly the transferfile 68. A single message, messagefile 60, may include a headerfile 62 followed by the datafile 56 associated with the headerfile 62.

The datafile 56 is a file 50 created by a software application (computer program) according to an organizational scheme, data structure, specific to the application. The datafile 56 may be readily read, written and operated upon by the software application. Multiple datafiles 56 may be included in a single messagefile 60. Each datafile 56 may be separated by a new headerfile 62 or simply a messagetype 64 and metafile 58 as needed.

The headerfile 62 may include an instructionfile 55, all or part of a metafile 58 associated with a datafile 56, a messagetype 64, and a security code 66. The metafile 58 may be written in whole or in part into the headerfile 62, according to the information needed by the communications nodes 10, 11 for properly identifying, transmitting, assembling, disassembling, reading, and writing datafiles 56, metafiles 58, and messagefiles 60 completely.

The instruction files 54, 55 contain data 52 in the nature of both information and control for the processor 20 or other logical device 38 for directing the assembly, sending and receipt of a messagefile 60. For example, the name and telephone number of the user associated with the host computer 13 may be written into the headerfile 62 along with the protocols for activating the telecommunications device 26 for establishing a communication connection over the telecommunications network 14. The instruction files 54, 55 may include administrative codes for enabling operation of a processor 20, lock 32, or filter 34.

A metafile 58 corresponds to an associated datafile 56. The metafile 58 is a file 50 containing data 52 corresponding to attributes associated with a datafile 56. The metafile 58 may reflect the type or name of an application that can read, write, edit, or execute the datafile 56. The metafile 58 may include data corresponding to the structure of the data 52 in the datafile 56, and other electronically coded information useful or essential to a processor or software application. The metafile 58 may contain information for enabling a processor 20 or host computer 12 to recognize a datafile 56 for reading, writing, editing, or executing, with or without the original application.

A messagetype 64 may be a single word of data 52 or a much larger file 50. The messagetype 64 may contain data 52 necessary for a host computer 12 to recognize and reconstruct a metafile 58 for a datafile 56. The key to the data structure of the metafile 58 or of the headerfile 62 may be contained in or activated by the messagetype 64. The messagetype 64 also may contain data 52 corresponding to information useful to the host computer 12 and communications node 10 for routing datafiles 56 to locations in the storage devices 116, 18, respectively. Thus, the messagetype 64 may be used to create pigeonholes or mailboxes (addresses, path names in a storage device 18) for routing and storing datafiles 56 and metafiles 58.

Figure 9:
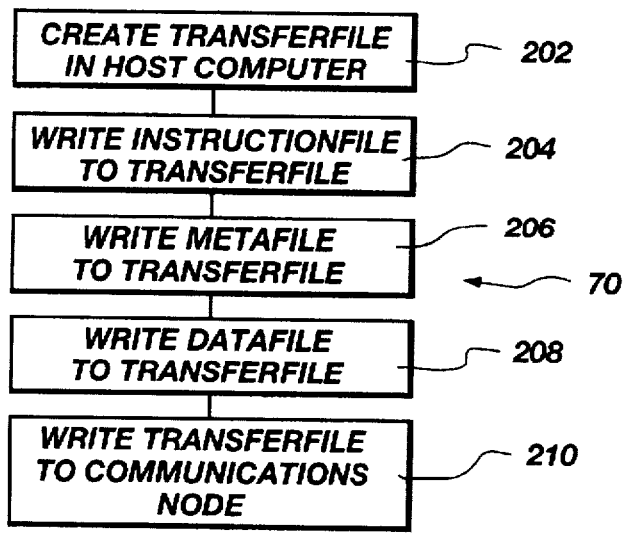
FIG. 9 is a schematic block diagram of operational steps made by a host computer in preparing a transferfile for transmission to an apparatus consistent with the invention.

Referring to FIG. 9, the host computer 12 may create a transferfile 68 by writing 202 a transferfile 68. Then, the CPU 104 may write 204 an instructionfile 54, write 206 a metafile 58, and write 208 a datafile 56, to RAM 114 or the hard disk drive 116. The CPU 104 may then send the transferfile 54 to the storage device 18 of the communications node 10.

Figure 10:
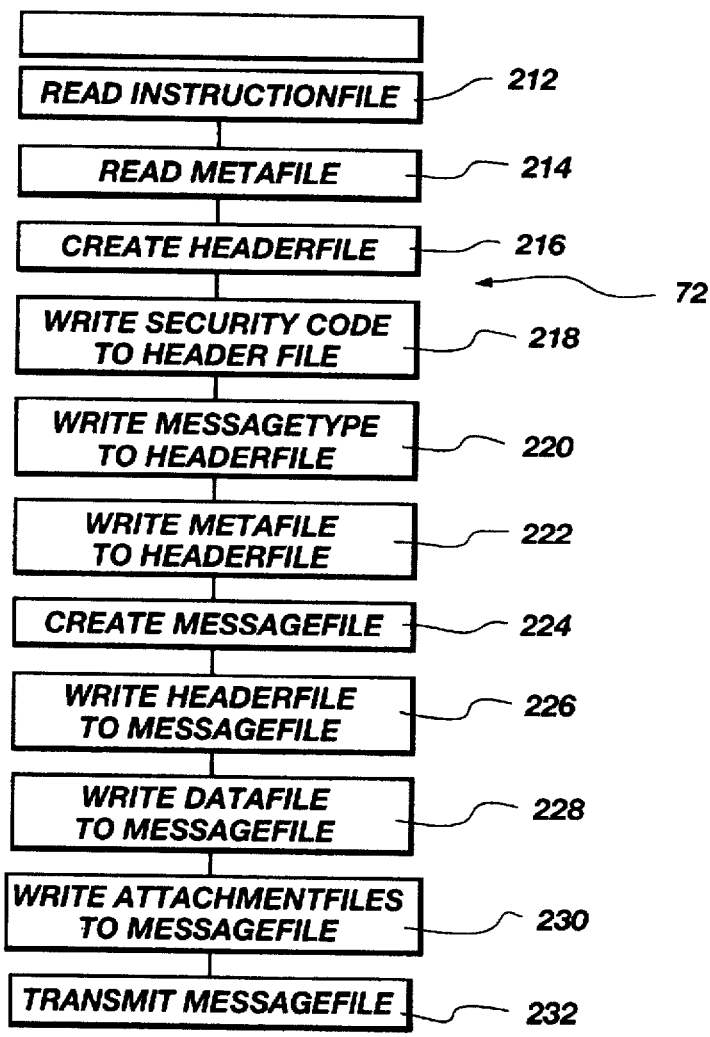
FIG. 10 is a schematic block diagram of operational steps made by an apparatus consistent with the invention in preparation for creating and sending a messagefile over a telecommunications network.

Referring to FIG. 10, the assembler 180 or processor 20 of the communications node 10 or a programmable modem 150 may read 212 the instructionfile 54, read 214 the metafile 58, and write 216 a headerfile 62 with data 52 contained therein and elsewhere in the node 10. For example, the assembler 180 or its equivalent in the processor 20 may write 218 the security code 66 obtained from the security device 28. The assembler 180 may write 220 the messagetype 64, and write 222 the metafile 58 (or a reduced metafile 58) to the headerfile 62.

A messagefile 60 may be written 224, followed by writing 226 the headerfile 62, writing 228 the datafile 56, and writing 230 any attachments (files 50) into the messagefile 60. The assembler 180 or processor 20 may then send the messagefile 60 directly to the telecommunications device 26, or to a location in the storage device 18 for access by a telecommunications device 26, for transmission 232 over the telecommunications network 14. The messagefile 60 may then be transmitted by the communications node 10 directly to another communications node 11 or to a programmable modem 150, or to another host computer 13 connected to a modem 148.

Figure 11:
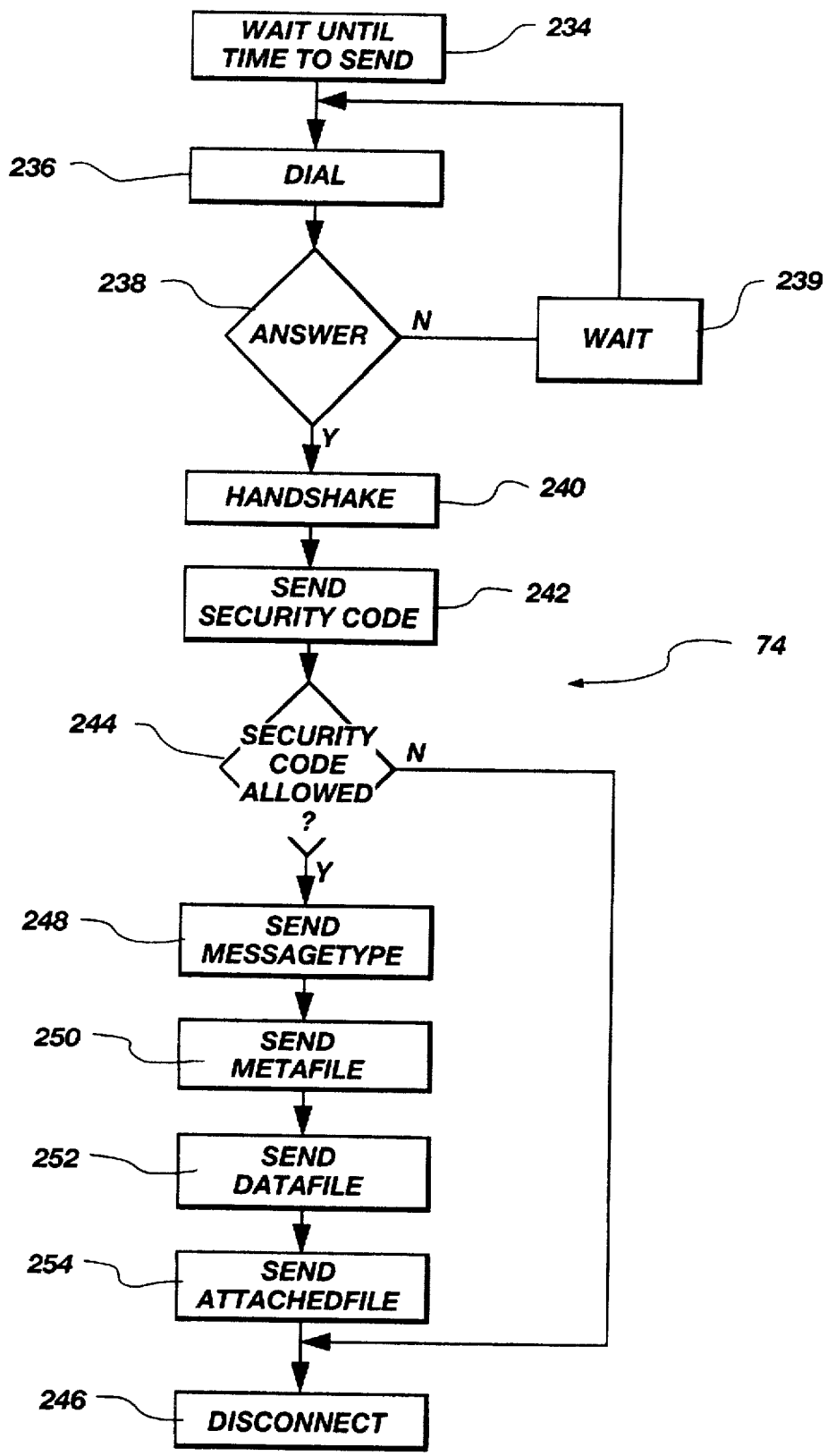
FIG. 11 is a schematic block diagram of operational steps made by an apparatus constructed consistent with the invention for communicating a messagefile from the apparatus a to another device connected to a telecommunications network.
Figure 12:
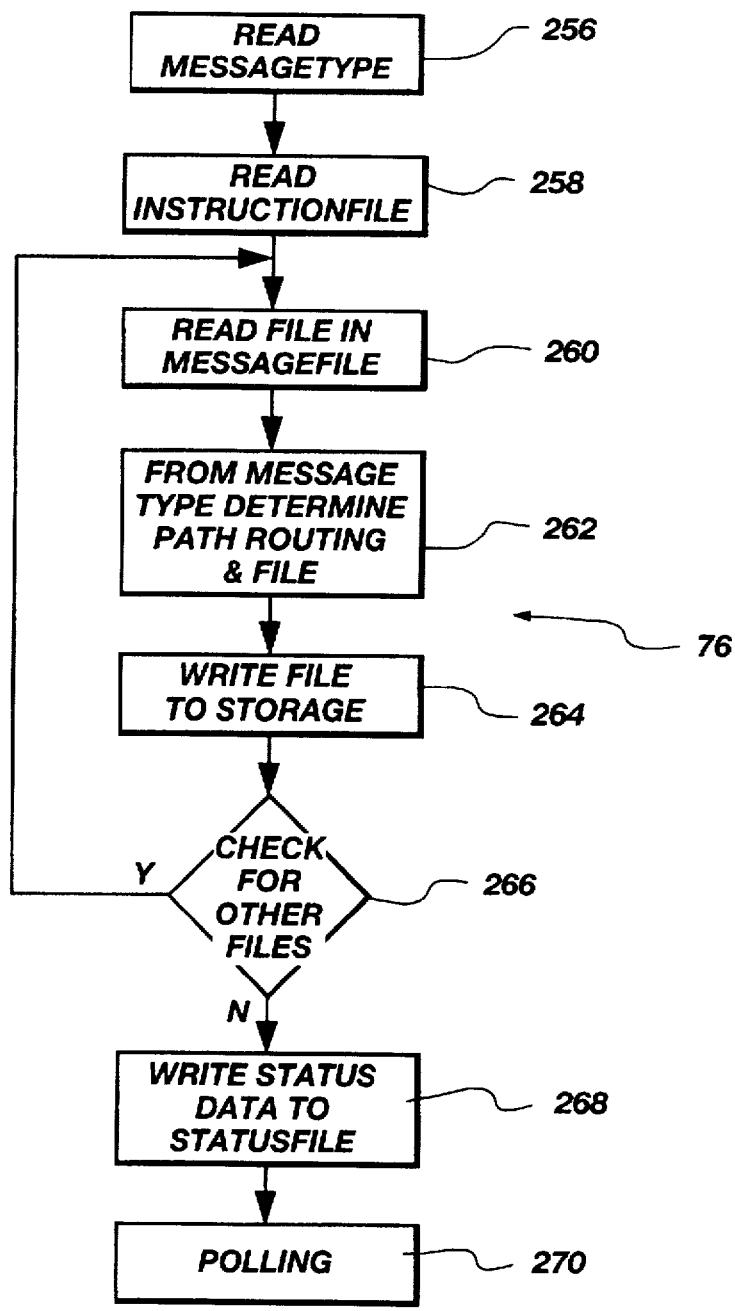
FIG. 12 is a schematic block diagram of operational steps for disassembly of a messagefile received by an apparatus constructed according to the invention.

Referring to FIG. 11, the telecommunications device 26 may be programmed (or controlled by the processor 20) to wait 234 for a preferred time to initiate communication over the telecommunications network 14. The communications node 10 may then dial 236 the telephone number of a communications node 11 through the telecommunications device 26. If an answer 238 does not occur from the node 11, the node 10 may wait 239 before trying again to dial 236.

The telecommunications device 26 may be programmed to dial 236 after a wait 239 of a selected time interval. Other line conditions such as "no dial tone," "no answer," "wrong number," and "interrupted communication" may also be provided for. For example, steps may be included to receive, interpret, and respond appropriately to such conditions, and may include feedback to a user identifying the line condition. When an answer 238 does result, then the nodes 10, 11 handshake 240 according to a file-transfer protocol established by the handshake 240.

The telecommunications device 26 may next send 242 a security code 66. If the security code 66 is not allowed 244, the telecommunications network 14 may be disconnected 246.

Alternatively, as part of the security code 66, or just before or after sending 242 the security code 66, the receiver's name may be transmitted as part of the headerfile 62. That is, since the files 50 in the headerfile 62 may be arranged in various orders, the name and other identification of the receiver and sender may be in the security code 66, instructionfile 55 or elsewhere in the headerfile 62. In one embodiment, the evaluation 244 of the security code 66 may include a check of the receiver's name against the telephone number called. A failure of these or similar identifiers to correspond may halt all further transmission of data 52. Thus, the security code 66 may be a benefit primarily to a receiving user, as a screening device for incoming call attempts. Meanwhile, the name or security code 66 of a recipient may serve as a criterion for halting transmission, if either does not correspond to those intended by a sending user as written in the headerfile 62.

Likewise, the appropriate messagetype 64 may be transmitted just before its associated metafile 58 and datafile 56, or may be included in the instructionfile 55 with other messagetypes 64 and coding to identify each messagetype 64 with its datafile 52 to follow. The sending node 10, 11 may then evaluate whether the receivers name correctly corresponds to the telephone number dialed. This evaluation may be part of the "security code allowed?" step 244, or an individual step prior to sending the security code.

Alternatively, the communications nodes 10, 11 associated with the host computers 12, 13 respectively may send 242 corresponding security codes 66 to one another. If the node 10, at the sending workstation 12, does not receive a proper, corresponding response, then the communication may be disconnected 246 or otherwise terminated. An ineligible security code 66 in a messagefile 60 may result in the filter 34 simply "hanging up" the line 152, terminating communication.

A communications node 10 or a programmable modem 150 receiving a messagefile 60 will first read the security code 66 in a received messagefile 60. If the security code 66 is ineligible, not allowed 244, the filter 34 may still allow the messagefile 60 to be received, but attach warnings written into the datafile 56 or elsewhere to be seen by a user. That is, the messagefile may be stored in the storage device 18 or processed by the disassembler 182 or processor 20 for limited purposes. Thus, a corrupted messagefile 60 may be recovered rather than lost. The filter 34 may send a command to the processor for controlling the eventual disposition of the messagefile 60. Alternatively, the filter 34 may simply halt transmission to the bus 16 of the messagefile 60 beyond the security code 66.

Still referring to FIG. 11, if the security code 66 is allowed 244, the communications node 10, 11 may send 248 the messagetype 64, send 250 the metafile 58, send 252 the datafile 56, send 254 any attached files 50, and disconnect 246.

Referring to FIG. 12, and FIGS. 1, 5, and 7, the disassembler 182 or processor 20 of the communications node 10 may read 256 the messagetype 64 from the headerfile 62 of a messagefile 60 having an acceptable security code 66. The disassembler 182 may read 258 an instructionfile 55 before reading 260 the first file 50. From the messagetype 64, the disassembler 182 may determine 262 the path for storing datafiles 56 or other types of files 50 associated with each messagetype 64. The disassembler 182 may then write 264 the file 50 to the storage device 18. From the remainder of the messagefile 60, the disassembler 182 may check 266 for more files 50, read 260, route 262 each by messagetype 64 and write 264 each file 50 in turn. The disassembler may write 264 a metafile 58, datafile 56, and any attached files 50, including the instructionfile 55 or messagefile 60 as desired, to the storage device 18, and may index each for retrieval by the host computer 12. Checking 266 for additional files 50, 56, 58 after each messagetype 64, the disassembler 182 is eventually done. The disassembler writes 268 status information to the status indicator 30 for broadcast over the bus 16, or to the storage device 18 or RAM 22 for storage and for polling 270 by the host 12 prior to retrieval.

The administrative module 178, disassembler 182, and assembler 180 may have activities distributed among them in a variety of ways. For example, the administrative module 178 may be removed. In this configuration, the assembler 180 and disassembler 182 may each include an internal processor 20, and may include internal memory 22. The assembler and processor may divide the maintenance and administrative processing. Alternatively, one of the assembler 180 and disassembler 182 may perform the operational and the administrative processing tasks, or one may perform one task only. In one embodiment of a node 10 or programmable modem 150, a single processor may be programmable to perform all administrative, operating, assembly, and disassembly tasks. Processing speed may be reduced by such consolidation.

Referring to FIGS. 13–14 a graphical user interface 100 may be presented in numerous formats. For example, the GUI 100 may present a panel 302 on a monitor 110 of a workstation 12 or host computer 12 (see FIGS. 1, 5). The panel 302 may include, for example, fields 304, 306, 308 for prompting a user to input data 52 by the keyboard 108 or other input device. The data 52 may be used by the CPU 104 for preparing a transferfile 68. The transferfile 68 may be used by the processor 20 for creating a messagefile 60.

The "To field" 306 may prompt a user to enter the name of the receiving user associated with the remote node 11. The "To field" 306 may display the input of the user for editing. The subject field 304 prompts and displays a short message relative to the subject of the messagefile 60, for inclusion in the messagefile 60 as a file 50. The add name button 310 and delete name button 312 are displayed, and, if designated by a user, may be used to create or eliminate "to fields" 306 corresponding to users at additional destinations. The attach button 314 and unattach button 316 may be designated after typing or designating a name or path of a file 50 written in the attach field 308.

A send button 320 may be designated by a user, causing the CPU 104 to form a transferfile 68 corresponding to the information and instructions displayed in the fields and buttons (304–322) of panel 302. A cancel button 322 may halt the CPU 104 or the node 10 from sending a transferfile 68 or messagefile 60, respectively.

Referring to FIG. 14, the panel 303 may display an inbox button 332, sent folder button 334, read folder button 336, forward button 338, and answer button 339. Each button 332–339 may be selected by a user to open a menu of files 50, each having the characteristic implied by the name of the button 332–339. The menu of files 50 would be listed in the display box 340. Scrolling buttons 342 may be designated for perusing the contents of the display box 340. Each file 50 may be stored in the computer 12, having been retrieved from the node 10. Also, the panels 302, 303 may display files stored in the storage device 18 of the node 10 by the processor 20 or disassembler 182. Likewise files stored in the hard disk 116 storage device of the host computer 12 by the user may be displayed.

The move button 342, copy button 344, and delete button 346 may be designated after designating a name of a file 50 displayed in the display box 340. When used in this latter manner, the buttons 342, 344, 346 may be used to dispose of files 50. Other buttons and menus, such as the attachment box 308 of panel 302 and 348 of panel 303 may be included for prompting a user, informing a user, or obtaining inputs from a user.

For example, the attachment box 308 may be used to list files 50 to be attached to a principal datafile 56. The attachment box 348 may be used to list files 50 attached to the principal datafile 56. Also, the date field 350, and time field 352 may be used to display information relevant to a time and date provided by the node 10. Likewise subject matter identified in the subject field 354 of a receiving user may have its source in the headerfile 62 of a messagefile, based on inputs into the subject field 304 of a sending user.

The present invention may be embodied in other specific forms without departing from its spirit or essential characteristics. The described embodiments are to be considered in all respects only as illustrative, and not restrictive. Likewise, the order of steps in processes described are by way of example, and may be performed in a different order to accomplish equivalent functions. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for transmitting and receiving, over a publicly available telecommiunications network, a messagefile transmitted directly between a first host computer, and a second host computer; the apparatus comprising:

a modem for operably connecting to the telecommunications network, and for sending and receiving files formatted for transmission through the telecommunications network;

a processor comprising a plurality of logic circuits for performing logical operations on data contained in a memory device operably connected to the processor, the processor being operably connected to the modem for selectively communicating files;

the messagefile comnprisng a datafile comprising a live file and a metafile bound to the datafile, wherein the processer associates the metafile with its respective datafile;

a storage device connected to the processor for storing the messagefiles; and a datacommunications device operably connected between the apparatus and the first host computer for providing access to the messagefiles in the storage device by the first host computer.

2. The apparatus of claim 1 further comprising an assembler operably connected to the processor for creating a headerfile corresponding to a format, data structure, and application associated with a datafile of the files for inclusion into a messagefile for transmission to the telecommunications network through the modem.

3. The apparatus of claim 1 further comprising a disassembler operably connected to the processor for reading a headerfile corresponding to a format, data structure, and application associated with a datafile included in a file received from the telecommunications network through the modem.

4. The apparatus of claim 1 further comprising a security device connected to the processor for providing to the processor data uniquely identifying the apparatus.

5. The apparatus of claim 1 further comprising a status indicator connected to the storage device for receiving signals associated with transmission of messages and datafiles to and from the storage device, and for displaying a symbol reflecting the status of the apparatus and of the storage device, the symbol being detectable and understandable by a user.

6. The apparatus of claim 1 further comprising a bus for transferring files, datafiles, metafiles, and messagefiles, the bus being operably connected to a security device for providing data corresponding to an unalterable code uniquely identifying the apparatus, and to a status indicator for providing a display reflecting the presence of a file in the apparatus.

7. The apparatus of claim 1 further comprising a display connected to the storage device to be readable by a user for displaying symbols associated with commands, data, datafiles and messagefiles.

8. The apparatus of claim 1 wherein the apparatus is comprised of a computer, and a conversion module operably connectable to the computer for emulating a flexible disk drive and for controlling the apparatus.

9. The apparatus of claim 1 further comprising a power supply connected to the processor and independently connectable to a source of electrical power for receiving messagefiles through the modem independently from the first host computer.

10. The apparatus of claim 1 further comprising a filter connected to the modem for selectively restricting transmission of files into the apparatus through the modem.

11. The apparatus of claim 1 further comprising a lock connected to the datacommunications device, for disabling the apparatus from reading and writing data to the first host computer, and for enabling the first host computer to read and write data to the apparatus.

12. A programmable conmmunications device for connecting to a telecommunications network, the programmable communications device comprising:

a memory device for storing messagefiles comprising datafiles containing metafiles and live files bound together;

a datacommunications device for operably connecting the programmable communications device to a comnputer for transferring the live files and metafiles between the computer and the programmable communications device;

a modem operably connectable to a telecommunications network for transferring the messagefiles from the programmable communications device to the telecommunications network;

a processor connected to the memory device for associating each metafile and live file with its datafile;

a power supply operably connected to the processor for powering operation of the programmable commnunications device independently from the power condition of the computer.

13. The programmable communications device of claim 12, wherein the telecommunications network is a telephone network.

14. The programmable communications device of claim 12 further comprising a storage device for storing data.

15. The programmable communications device of claim 14 wherein the storage device is a nonvolatile storage device for containing the datafiles, metafiles and messagefiles.

16. The programmable communications device of claim 15 wherein the nonvolatile storage device is a hard disk drive.

17. The programmable communications device of claim 12 further comprising a security device operably connected to the processor for providing data to the processor, the data corresponding to security data uniquely associated with the programmable communications device.

18. The programmable communications device of claim 12 further comprising an assembler for wriiing a messagefile for sending through the modem, the messagefile containing data corresponding to a message type for controlling storage and interpretation of a datafile, a security code corresponding to the programmable communications device, the datafile, and a metafile associated with the datafile.

19. The programmable communications device of claim 12 further comprising a disassembler for reading a messagefile received through the modem and creating datafiles and associated metafiles readable by the computer, the messagefile containing data corresponding to a message type for controlling interpretation and storage of a datafile, a security code corresponding to another programmable communications device, the datafile, and a metafile associated with the datafile.

20. The programmable commnunications device of claim 12 further comprising a filter for selectively restricting transmission of data into the programmable communications device through the modem.

21. The programmable communications device of claim 20, wherein the filter is comprised of a locking device for restricting receipt of messagefiles improperly directed thereto, the locking device being actuable by data read as metafile data.

22. The programmnable communications device of claim 20 further comprising a filter connected to the datacommunications device for restricting the programmable communications device from reading data from the computer.

23. The programmable communications device of claim 12 further comprising a forwarding device connected to the modem, for selectively re-transmitting through the modem to the telecommunications network, a messagefile and data received by the programmable communications device through the modem.

* * * * *

UNITED STATES PATENT AND TRADEMARK OFFICE
CERTIFICATE OF CORRECTION

PATENT NO. : 5,764,918
DATED : June 9, 1998
INVENTOR(S) : Vernon C. Poulter

It is certified that error appears in the above-identified patent and that said Letters Patent is hereby corrected as shown below:

In column 1, line 21, delete "(Email)", and insert therefor -- (E-mail) --.
In column 2, line 1, after "ments", please insert -- . --.
In column 5, line 43, delete "halrdwired", and insert therefor -- hardwired --.
In column 6, line 55, delete "embodiment,", and insert therefor -- embodiment --.
In column 7, line 12, delete "a" (second occurrence).
In column 8, line 30, delete "(e.g", and insert therefor -- (e.g., --.
In column 9, line 2, delete "instruction files", and insert therefor -- instructionfiles --.
In column 9, line 62, delete "66) ,", and insert therefor -- 66), --.
In column 14, line 66, delete "dat-accommunications", and insert -- therefor datacommunications --.
In column 20, line 55, delete "instruction files", and insert therefor -- instructionfiles --.
In column 20, line 63, delete "instruction files", and insert therefor -- instructionfiles --.

Signed and Sealed this

Tenth Day of November 1998

Attest:

BRUCE LEHMAN

*Attesting Officer*     *Commissioner of Patents and Trademarks*